(12) United States Patent
Motonaga

(10) Patent No.: US 12,427,667 B2
(45) Date of Patent: Sep. 30, 2025

(54) ROBOT SYSTEM, METHOD FOR CONTROLLING ROBOT SYSTEM, METHOD FOR MANUFACTURING ARTICLE USING ROBOT SYSTEM, SYSTEM, METHOD FOR CONTROLLING SYSTEM, AND RECORDING MEDIUM

(71) Applicant: CANON KABUSHIKI KAISHA, Tokyo (JP)

(72) Inventor: Yusaku Motonaga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 17/822,385

(22) Filed: Aug. 25, 2022

(65) Prior Publication Data

US 2023/0062371 A1 Mar. 2, 2023

(30) Foreign Application Priority Data

Aug. 31, 2021 (JP) .................................. 2021-141146
Jun. 13, 2022 (JP) .................................. 2022-095303

(51) Int. Cl.
*B25J 9/16* (2006.01)
*B25J 13/00* (2006.01)
*B25J 13/08* (2006.01)

(52) U.S. Cl.
CPC ........... *B25J 9/1674* (2013.01); *B25J 9/1612* (2013.01); *B25J 9/1653* (2013.01); *B25J 13/006* (2013.01); *B25J 13/085* (2013.01)

(58) Field of Classification Search
CPC ...... B25J 9/1674; B25J 9/1612; B25J 9/1653; B25J 13/006; B25J 13/085; G05B 2219/40201; G05B 2219/40202
See application file for complete search history.

(56) References Cited

U.S. PATENT DOCUMENTS

| | | | |
|---|---|---|---|
| 12,014,539 B2 * | 6/2024 | Hayashi | .................... G06F 1/12 |
| 2011/0015785 A1 * | 1/2011 | Tsusaka | ................. G05B 19/42 700/254 |
| 2011/0282490 A1 * | 11/2011 | Weigele | ................. B25J 9/1674 700/250 |
| 2015/0057799 A1 * | 2/2015 | Ueberle | ................. B25J 9/1674 700/253 |
| 2015/0127158 A1 * | 5/2015 | Shimodaira | .......... G05B 19/401 901/41 |

(Continued)

FOREIGN PATENT DOCUMENTS

| | | |
|---|---|---|
| JP | 2007257657 A | 10/2007 |
| JP | 2014213400 A | 11/2014 |
| JP | 2016146184 A | 8/2016 |

*Primary Examiner* — Sohana Tanju Khayer

(74) *Attorney, Agent, or Firm* — Canon U.S.A., Inc. IP Division

(57) ABSTRACT

A robot system includes a robot main body, a plurality of first control devices provided in the robot main body, and a detection unit configured to detect a state of the robot main body. In a case where one of the plurality of first control devices determines that the robot main body is in a predetermined state based on a detection result of the detection unit, the one of the plurality of first control devices outputs information indicating that the robot main body is in the predetermined state to another one of the plurality of first control devices other than the one of the plurality of first control devices.

26 Claims, 19 Drawing Sheets

(56) References Cited

U.S. PATENT DOCUMENTS

| | | | | |
|---|---|---|---|---|
| 2016/0354925 | A1* | 12/2016 | Shimodaira | B25J 9/1633 |
| 2017/0007336 | A1* | 1/2017 | Tsuboi | B25J 9/1674 |
| 2017/0259433 | A1* | 9/2017 | Takeuchi | B25J 13/085 |
| 2017/0266816 | A1* | 9/2017 | Takeuchi | B25J 13/085 |
| 2018/0111270 | A1* | 4/2018 | Hasegawa | B25J 9/1682 |
| 2021/0138638 | A1* | 5/2021 | Masuda | B25J 9/161 |
| 2022/0009107 | A1* | 1/2022 | Zimmer | H04B 1/02 |
| 2023/0001581 | A1* | 1/2023 | Saito | B25J 9/1664 |

* cited by examiner

ROBOT SYSTEM, METHOD FOR CONTROLLING ROBOT SYSTEM, METHOD FOR MANUFACTURING ARTICLE USING ROBOT SYSTEM, SYSTEM, METHOD FOR CONTROLLING SYSTEM, AND RECORDING MEDIUM

BACKGROUND

Field of the Disclosure

The present disclosure relates to a robot system and a system.

Description of the Related Art

Collaborative robots that are industrial robots for use in factories and can collaborate with human workers have been developed in recent years. Such collaborative robots are expected to respond to external changes. For example, in a case where a collaborative robot detects contact with a human worker, the collaborative robot is expected to stop. For example, in a technique discussed in Japanese Patent Application Laid-Open No. 2016-146184, an abnormality is determined based on measurement information obtained by a lower unit controlling motors of a robot, thereby an upper unit that controls the entire robot stops power supply to the lower unit.

SUMMARY

According to an aspect of the present disclosure, a robot system includes a robot main body, a plurality of first control devices provided in the robot main body, and a detection unit configured to detect a state of the robot main body. In a case where one of the plurality of first control devices determines that the robot main body is in a predetermined state based on a detection result of the detection unit, the one of the plurality of first control devices outputs information indicating that the robot main body is in the predetermined state to another one of the plurality of first control devices other than the one of the plurality of first control devices.

Further features of the present disclosure will become apparent from the following description of exemplary embodiments with reference to the attached drawings.

DESCRIPTION OF THE EMBODIMENTS

Figure 1:
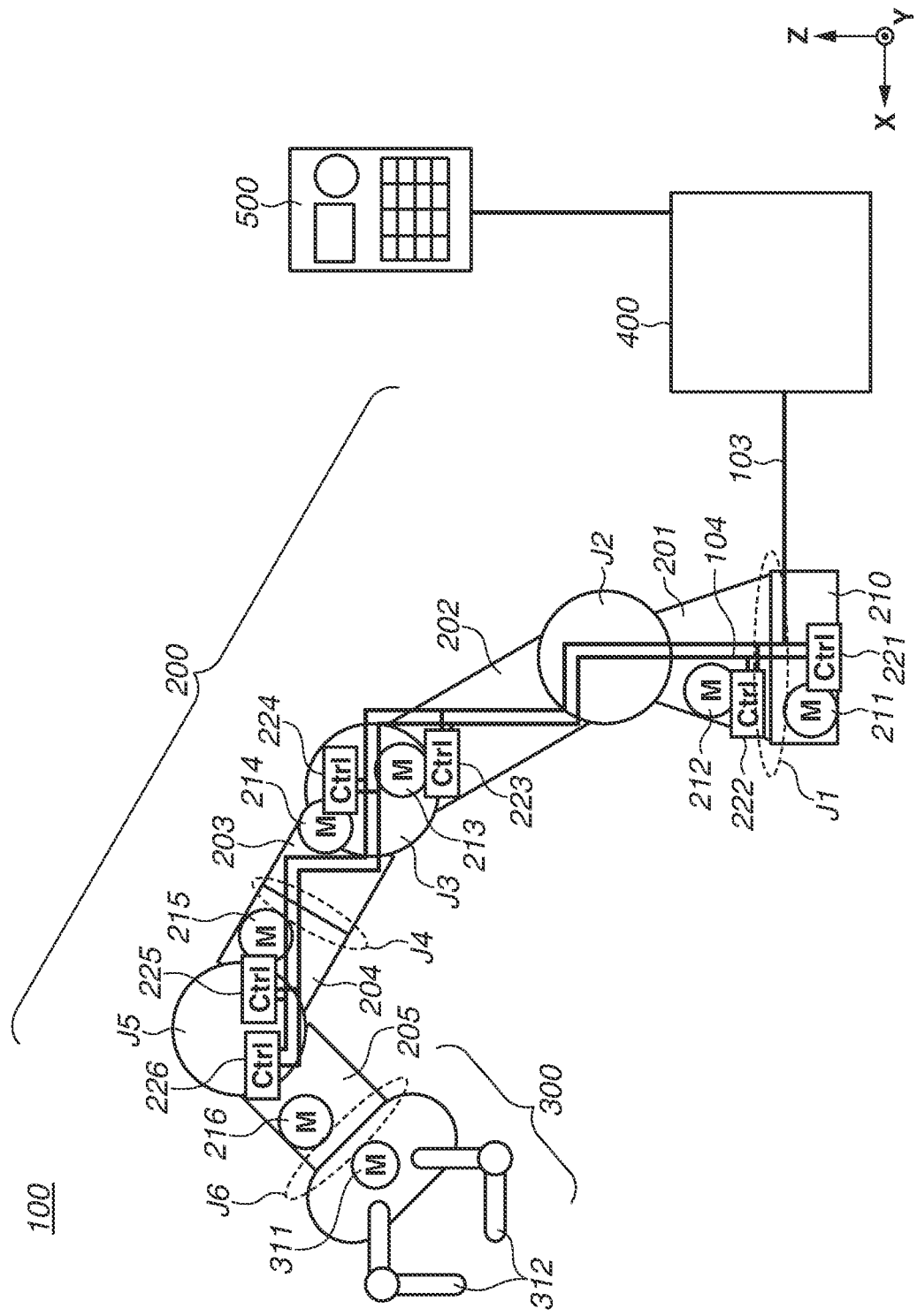
FIG. 1 is a schematic view illustrating a robot system according to one or more aspects of the present disclosure.

With the technique discussed in Japanese Patent Application Laid-Open No. 2016-146184, an emergency stop signal is output to the lower unit via the upper unit to stop the robot after determining the abnormality based on the measurement information obtained by the lower unit. This gives rise to an issue that the robot becomes less responsive to external changes.

The present disclosure is in view of the above-described issue and is directed to providing a robot system with improved responsiveness to external changes.

Various exemplary embodiments of the present disclosure will be described below with referenced to the attached drawings. It should be noted that the exemplary embodiments described below are mere examples and, for example, configurations of details can be changed as needed by a person skilled in the art without departing from the spirit of the present disclosure. Further, numerical values discussed in the exemplary embodiments are merely for reference and are not intended to limit the scope of the present disclosure. Further, arrows X, Y, and Z in the drawings represent a coordinate system of an entire robot system. In general, the XYZ three-dimensional coordinate system represents a world coordinate system of an entire installation environment. A local coordinate system is sometimes used for a robot hand, a finger portion, or a joint as needed for convenience of control.

FIG. 1 is a plan view illustrating a robot system 100 according to a first exemplary embodiment, viewed from a direction in the XYZ coordinate system. As illustrated in FIG. 1, the robot system 100 includes a robot arm main body 200 and a robot hand main body 300 as a robot main body. The robot arm main body 200 includes a plurality of joints.

The robot system 100 further includes a control apparatus 400. The control apparatus 400 controls operations of an entire robot apparatus. The robot system 100 further includes an external input apparatus 500 as a training apparatus that transmits training data to the control apparatus 400. A teaching pendant is an example of the external input apparatus 500. An operator designates positions of the robot arm main body 200 and the robot hand main body 300 using the external input apparatus 500.

While a robot hand is described as an end effector connected to a distal end portion of the robot arm main body 200 according to the present exemplary embodiment, the end effector is not limited to a robot hand but to a tool.

A link 201 is provided as a base end of the robot arm main body 200.

The robot arm main body 200 includes a base 210, a plurality of joints J1 to J6, e.g., six joints (six axes), and a plurality of links 201 to 205. The joints J1 to J6 also include a plurality of (i.e., six) arm motors 211 to 216 as driving sources that drive and rotate the joints J1 to J6 around corresponding rotation axes. The arm motors 211 to 216 each include a motor encoder (not illustrated) that detects a rotation position of a motor output shaft.

Figure 2:
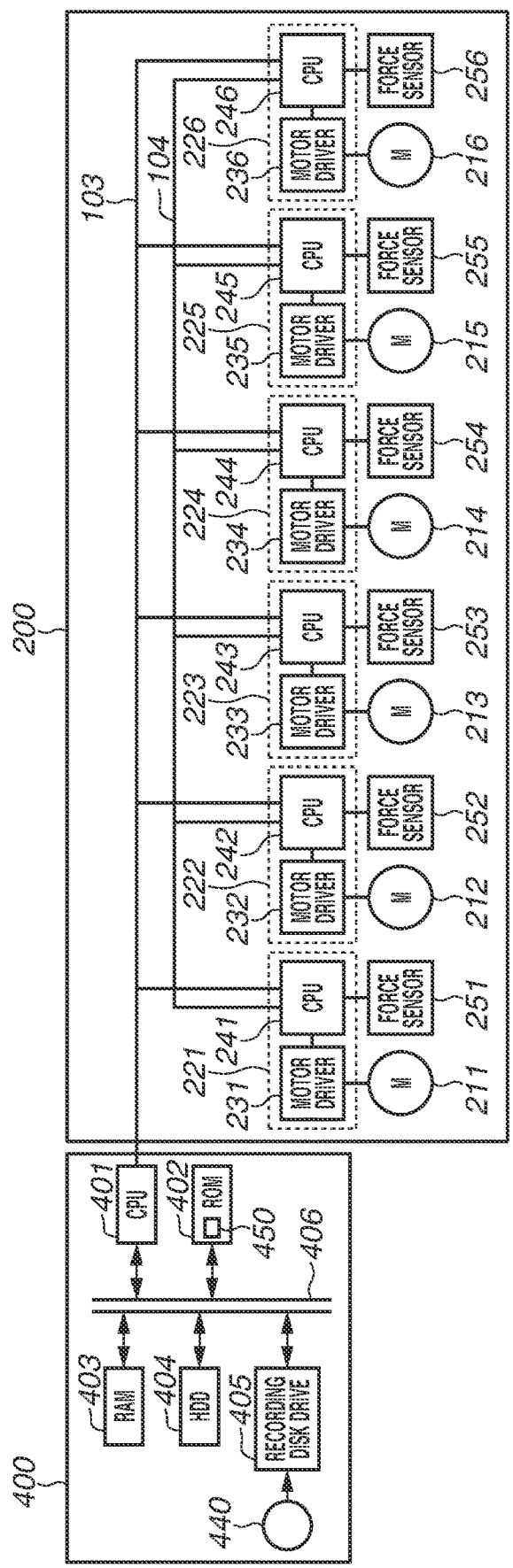
FIG. 2 is a control block diagram illustrating a robot arm main body according to one or more aspects of the present disclosure.

The robot arm main body 200 further includes arm motor control devices 221 to 226 and force sensors 251 to 256 (FIG. 2). The arm motor control devices 221 to 226 control the arm motors 211 to 216, respectively. The force sensors 251 to 256 detect torques as information about forces applied to the joints J1 to J6. While the arm motor control devices 221 to 226 are illustrated outside the robot arm main body 200 in FIG. 1 for simplification of descriptions, the arm motor control devices 221 to 226 are situated in the vicinity of the corresponding arm motors 211 to 216 in the base 210 and the links 201 to 205.

The plurality of links 201 to 205 of the robot arm main body 200 and the robot hand main body 300 are rotatably connected together with the joints J1 to J6. The links 201 to 205 are serially connected in this order from the base end to the distal end of the robot arm main body 200.

As illustrated in FIG. 1, the base 210 and the link 201 of the robot arm main body 200 are connected together via the joint J1 rotatable about an axis in the direction of the arrow of Z-axis in FIG. 1. Rotations of the arm motor 211 are transmitted to the link 201 by a transmission mechanism (not illustrated) to rotate the link 201 about the axis in the direction of the arrow of Z-axis in FIG. 1.

The links 201 and 202 of the robot arm main body 200 are connected together via the joint J2 rotatable about an axis in the direction of the arrow of Y-axis in FIG. 1. Rotations of the arm motor 212 are transmitted to the link 202 by a transmission mechanism (not illustrated) to rotate the link 202 about the axis in the direction of the arrow of Y-axis in FIG. 1.

The links 202 and 203 of the robot arm main body 200 are connected together via the joint J3 rotatable about an axis in the direction of the arrow of Y-axis in FIG. 1. Rotations of the arm motor 213 are transmitted to the link 203 by a transmission mechanism (not illustrated) to rotate the link 203 about the axis in the direction of the arrow of Y-axis in FIG. 1.

The links 203 and 204 of the robot arm main body 200 are connected together via the joint J4 rotatable about an axis in a predetermined direction on the XZ-plane in FIG. 1. Rotations of the arm motor 214 are transmitted to the link 204 by a transmission mechanism (not illustrated) to rotate the link 204 about the axis in the predetermined direction on the XZ-plane in FIG. 1.

The links 204 and 205 of the robot arm main body 200 are connected together via the joint J5 rotatable about an axis in the direction of the arrow of Y-axis in FIG. 1. Rotations of the arm motor 215 are transmitted to the link 205 by the transmission mechanism (not illustrated) to rotate the link 205 about the axis in the direction of the arrow of Y-axis in FIG. 1.

The link 205 of the robot arm main body 200 and the robot hand main body 300 are connected together via the joint J6 rotatable about an axis in a predetermined direction on the XZ-plane in FIG. 1. Rotations of the arm motor 216 are transmitted to the robot hand main body 300 by a transmission mechanism (not illustrated) to rotate the robot hand main body 300 about the axis in the predetermined direction on the XZ-plane in FIG. 1.

The robot hand main body 300 grips a target object such as a part or a tool. A driving mechanism (not illustrated) and a hand motor 311 open or close two finger portions 312 of the robot hand main body 300 according to the present exemplary embodiment to grip or release a work without changing a relative position of the work with respect to the robot arm main body 200.

The robot hand main body 300 also includes a built-in hand motor control device (not illustrate) for controlling the driving of the hand motor 311. The robot hand main body 300 is connected to the link 205 via the joint J6. When the joint J6 rotates, the robot hand main body 300 is also rotated.

The arm motor control devices 221 to 226 are each communicably connected to the control apparatus 400 through two systems of communication lines 103 and 104. The communication line 103 connects the control apparatus 400 and the arm motor control devices 221 to 226 together, and thereby instructions from the control apparatus 400 and responses from the arm motor control devices 221 to 226 are exchanged. The communication lines 103 and 104 will also be referred to as "first communication line" and "second communication line", respectively. Further, the communication via the communication line 103 will also be referred to as "first communication", and the communication via the communication line 104 will also be referred to as "second communication".

The control apparatus 400 transmits a control target value for each of the arm motors 211 to 216 based on an operation path input in advance from the external input apparatus 500, to the arm motor control devices 221 to 226, to comprehensively control the arm motor control devices 221 to 226. The arm motor control devices 221 to 226 transmit various types of information, such as current angles of the arm motors 211 to 216, to the control apparatus 400. The transmission from the control apparatus 400 to the arm motor control devices 221 to 226 and the transmission from the arm motor control devices 221 to 226 to the control apparatus 400 are performed in a predetermined communication period. The control apparatus 400 and the arm motor control devices 221 to 226 can be connected together using a connection method such as a cascade connection, a bus connection, or a daisy-chain connection. According to the present exemplary embodiment, the connection method is a bus connection.

The arm motor control devices 221 to 226 are connected together via the communication line 104 thereby sharing various types of information among the arm motor control devices 221 to 226. The arm motor control devices 221 to 226 can be connected together using a connection method such as a cascade connection, a bus connection, or a daisy-chain connection. According to the present exemplary embodiment, the connection method is a bus connection. The arm motor control devices 221 to 226 share various types of information via the communication line 104 using a shorter communication period than the communication period used in the communication line 103. The communication period used in the communication line 103 is about 2 milliseconds (ms), and the communication period used in the communication line 104 is about 100 microseconds (μs). While not illustrated for simplification of descriptions, the communication lines 103 and 104 are also connected to the hand motor control device to enable communication between the hand motor control device and the control apparatus 400 and the arm motor control devices 221 to 226.

A hand end of the robot arm main body 200 according to the present exemplary embodiment refers to the robot hand main body 300. In a case where the robot hand main body 300 grips an object, the robot hand main body 300 and the gripped object (e.g., a part, and a tool) are collectively referred to the hand end of the robot arm main body 200. In other words, regardless of whether the robot hand main body 300 is in a state of gripping an object or not, the robot hand main body 300 as an end effector is referred to as the hand end.

With the foregoing structure, the robot arm main body 200 moves the robot hand main body 300 to a desired position and causes the robot hand main body 300 to perform a desired operation at the desired position. For example, the robot hand main body 300 assembles a predetermined work and another work, as components, together to thereby manufacture the assembled works as a deliverable. Thus, the robot arm main body 200 can manufacture articles.

The robot hand main body 300 can be, for example, an end effector, such as an air hand driven by air pressure. Further, the robot hand main body 300 can be attached to the link 205 by a half-fixing method, such as screwing, or by an attaching/detaching method, such as latching. Especially in a case where the robot hand main body 300 is attachable and detachable, the following method may be used. Specifically, the robot arm main body 200 is controlled to perform an operation to attach, detach, or replace one of a plurality of types of robot hand main bodies 300 placed at supply positions.

FIG. 2 is a control block diagram illustrating the robot arm main body 200. The arm motor control devices 221 to 226 provided to the joints J1 to J6 of the robot arm main body 200 respectively include motor drivers 231 to 236, central processing units (CPUs) 241 to 246, and the force sensors 251 to 256.

The control apparatus 400 includes a CPU 401, and, as storage units, a read-only memory (ROM) 402, a random access memory (RAM) 403, a hard disk drive (HDD) 404, and a recording disk drive 405.

The control apparatus 400 further includes an input/output interface (not illustrated) for communicating with the external input apparatus 500. The CPU 401, the ROM 402, the RAM 403, the HDD 404, and the recording disk drive 405 are communicably connected together via a bus 406. The CPU 401 is also connected to the communication line 103 to communicate with the CPUs 241 to 246 of the joints J1 to J6.

The ROM 402 is a non-transitory storage device. The ROM 402 stores a basic program 450, such as a basic input/output system (BIOS), for causing the CPU 401 to perform various types of calculation processing. The basic program 450 is read by the CPU 401 during activation. The CPU 401 performs the various types of calculation processing based on the basic program 450 recorded (stored) in the ROM 402. The basic program 450 can be stored in the HDD 404.

The RAM 403 is a transitory storage device for use in the calculation processing by the CPU 401. The HDD 404 is a non-transitory storage device that stores various types of data, such as results of the calculation processing by the CPU 401. The recording disk drive 405 can read various types of data and programs recorded in a recording disk 440.

While the basic program 450 is recorded in the ROM 402 according to the present exemplary embodiment, the recording is not limited to this. The basic program 450 can be recorded in any type of recording medium as long as the recording medium is a computer-readable non-transitory recording medium. Examples of the recording medium that provides the basic program 450 to a computer include flexible disks, optical disks, magnetooptical disks, magnetic tapes, and non-volatile memories.

The CPUs 241 to 246 control the arm motors 211 to 216 based on instructions from the CPU 401 of the control apparatus 400. The force sensors 251 to 256 periodically detect forces applied to the joints J1 to J6, and output the detection results to the CPUs 241 to 246. While torque sensors that detect torques applied to the joints J1 to J6 as forces are used according to the present exemplary embodiment, the force sensors 251 to 256 are not limited to torque sensors. Any sensors capable of acquiring external change information about the robot arm main body 200 can be used as the force sensors 251 to 256. The motor drivers 231 to 236 are driver circuits that generate electric currents to control the arm motors 211 to 216 based on input signals from the CPUs 241 to 246.

The CPU 401 receives, for example, training point data input from the external input apparatus 500 via an interface (not illustrated). Further, the CPU 401 generates paths of the axes of the robot arm main body 200 based on the training point data input from the external input apparatus 500, and transmits the generated paths to the CPUs 241 to 245 via the communication line 103. The CPU 401 outputs driving instruction data indicating control amounts of rotation angles of the arm motors 211 to 216, to the CPUs 241 to 246 at predetermined intervals.

The CPUs 241 to 246 calculate amounts of electric current output to the arm motors 211 to 216 based on driving instructions input from the CPU 401, and output the calculated amounts to the motor drivers 231 to 236. The motor drivers 231 to 236 then feed electric currents to the arm motors 211 to 216 and control the angles of the joints J1 to J6. The CPUs 241 to 246 perform feedback control on the arm motors 211 to 216 such that current values of the angles of the joints J1 to J6 that are acquired based on rotation angles of motor output axis detected by the motor encoder (not illustrated) correspond to target joint angles.

Further, the force sensors 251 to 256 output force information as detection results to the CPUs 241 to 246. Specifically, the CPUs 241 to 246 acquire changes in torques applied to the joints J1 to J6 that are detected by the force sensors 251 to 256. The CPUs 241 to 246 can also control the forces and stop the robot arm main body 200 based on the force information from the force sensors 251 to 256.

Figure 3:
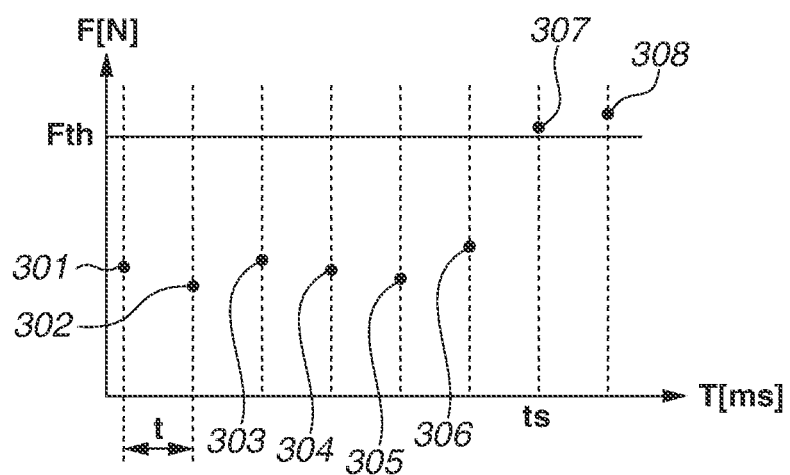
FIG. 3 is a diagram illustrating a method for detecting contact with the robot arm main body according to one or more aspects of the present disclosure.

Next, a method for detecting contact with the robot arm main body 200 from detection values of forces (torques) acquired by the force sensors 251 to 256 will be described below. FIG. 3 is a diagram illustrating a method for detecting contact with the robot arm main body 200 according to the present exemplary embodiment. Detection values illustrated in FIG. 3 are detection values that are read from the force sensor 251. In FIG. 3, a vertical axis represents force F [N] indicating magnitudes of detection values of the force sensor 251, whereas a horizontal axis represents reading time T (ms) indicating time points of reading detection values of force F from the force sensor 251.

Plotted points 301 to 308 illustrated in FIG. 3 represent detection values of force F read at corresponding time points. The CPUs 241 to 246 of the joints J1 to J6 acquire detection values of force F from the connected force sensors 251 to 256 with a period t. The acquired detection values of force F are used for controlling load torques of the arm motors 211 to 216 and detecting contact with a predetermined object or a user near the robot arm main body 200.

A contact determination value Fth is a reference value for determining whether there is contact with the robot arm main body 200. If an acquired detection value of force F exceeds the contact determination value Fth, it is determined that a contact with the robot arm main body 200 has occurred. In FIG. 3, a condition F>Fth is seen at the plotted point 307 and thereafter, and thus it is determined that contact has occurred at time ts.

Next, communication data exchanged between the CPU 401 of the control apparatus 400 and the CPUs 241 to 246 of the arm motor control devices 221 to 226 will be described below with reference to FIGS. 4A and 4B.

Figure 4:
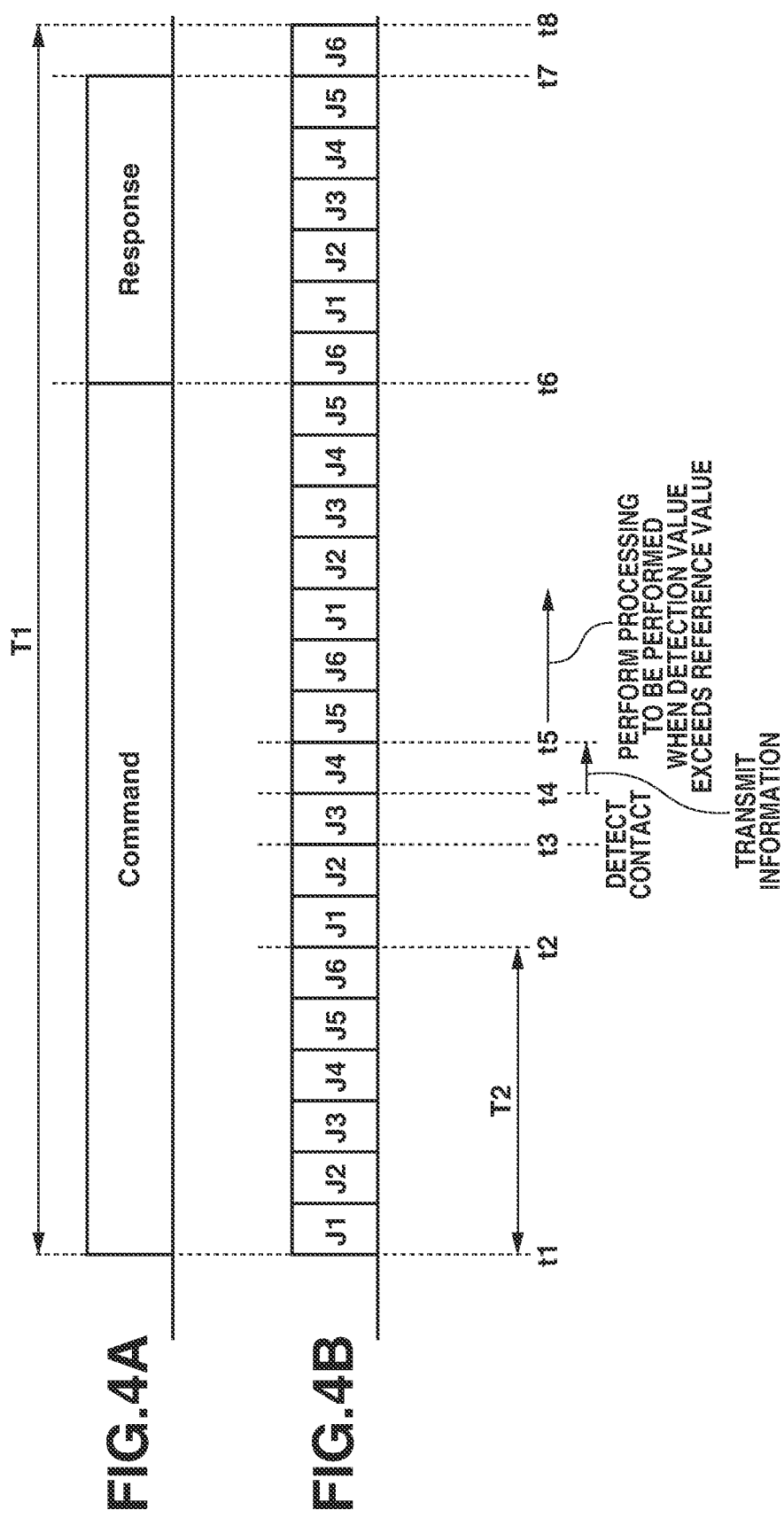
FIGS. 4A and 4B are diagrams illustrating timing charts of communication data exchanged between a central processing unit (CPU) and CPUs of joints according to one or more aspects of the present disclosure.

FIGS. 4A and 4B are diagrams illustrating timing charts of communication data exchanged between the CPU 401 and the CPUs 241 to 246 of the joints J1 to J6. Exchanges of the communication data in FIG. 4A are performed via the communication line 103. FIG. 4B illustrates communication data exchanged among the CPUs 241 to 246. Exchanges of the communication data illustrated in FIG. 4B are performed via the communication line 104. While the communication line 104 is unconnected to the control apparatus 400 according to the present exemplary embodiment, the communication line 104 can be connected to the control apparatus 400 such that the control apparatus 400 receives data via the communication line 104.

In FIG. 4A, the CPU 401 transmits a command to the CPUs 241 to 246 of the joints J1 to J6 and receives information from the CPUs 241 to 246 in response to the transmitted command during a period of T1. From time t1 to time t6, a command is transmitted to the CPUs 241 to 246 of the joints J1 to J6. From time t6 to time t7, the CPUs 241 to 246 of the joints J1 to J6 sequentially transmit to the CPU 401 various types of information acquired by the force sensors 251 to 256 and the encoders. From time t8, similarly to time t1, the CPU 401 transmits a command to the CPUs 241 to 246 of the joints J1 to J6, and the transmission and reception described above are repeated.

As described in FIG. 4B, the CPUs 241 to 246 of the joints J1 to J6 transmit and receive various types of information to and from each other from time t1 to time t2 (period T2). Portions J1 to J6 illustrated in FIG. 4B indicate communication data transmitted by the CPUs 241 to 246. For example, the portion J1 corresponds to a time during which the CPU 241 transmits information acquired from the force sensor 251 and the encoder of the joint J1 to the CPUs 242, 243, 244, 245, and 246. From time t2, the CPUs 241 to 246 transmit and receive various types of information to and from each other at the period T2.

The communication in a case where contact is detected will now be described. For example, in a case where the CPU 244 of the joint J4 acquires a detection value of a force that exceeds the reference value at time t3, the CPU 244 transmits information indicating that the detection value has exceeded the reference value, together with various types of information, to the CPUs 241, 242, 243, 245, and 246 of the arm motor control devices 221, 222, 223, 225, and 226 other than the arm motor control device 224 including the CPU 244, from time t4 at which the CPU 244 starts transmitting the various types of information. From time t5, the other CPUs 241, 242, 243, 245, 246 having received the information indicating that the detection value has exceeded the reference value and the CPU 244 perform processing that is to be performed in a case where a detection value exceeds the reference value. According to the present exemplary embodiment, if a detection value exceeds the reference value, the arm motors 211 to 216 of the joints J1 to J6 are slowed down and stopped. Details thereof will be described below. While the processing that is to be performed when a detection value exceeds the reference value is performed from time t5 at which the information transmission is ended according to the present exemplary embodiment, the processing that is to be performed by the CPU 244 when a detection value exceeds the reference value can be performed in parallel with the information transmission.

Figure 5:
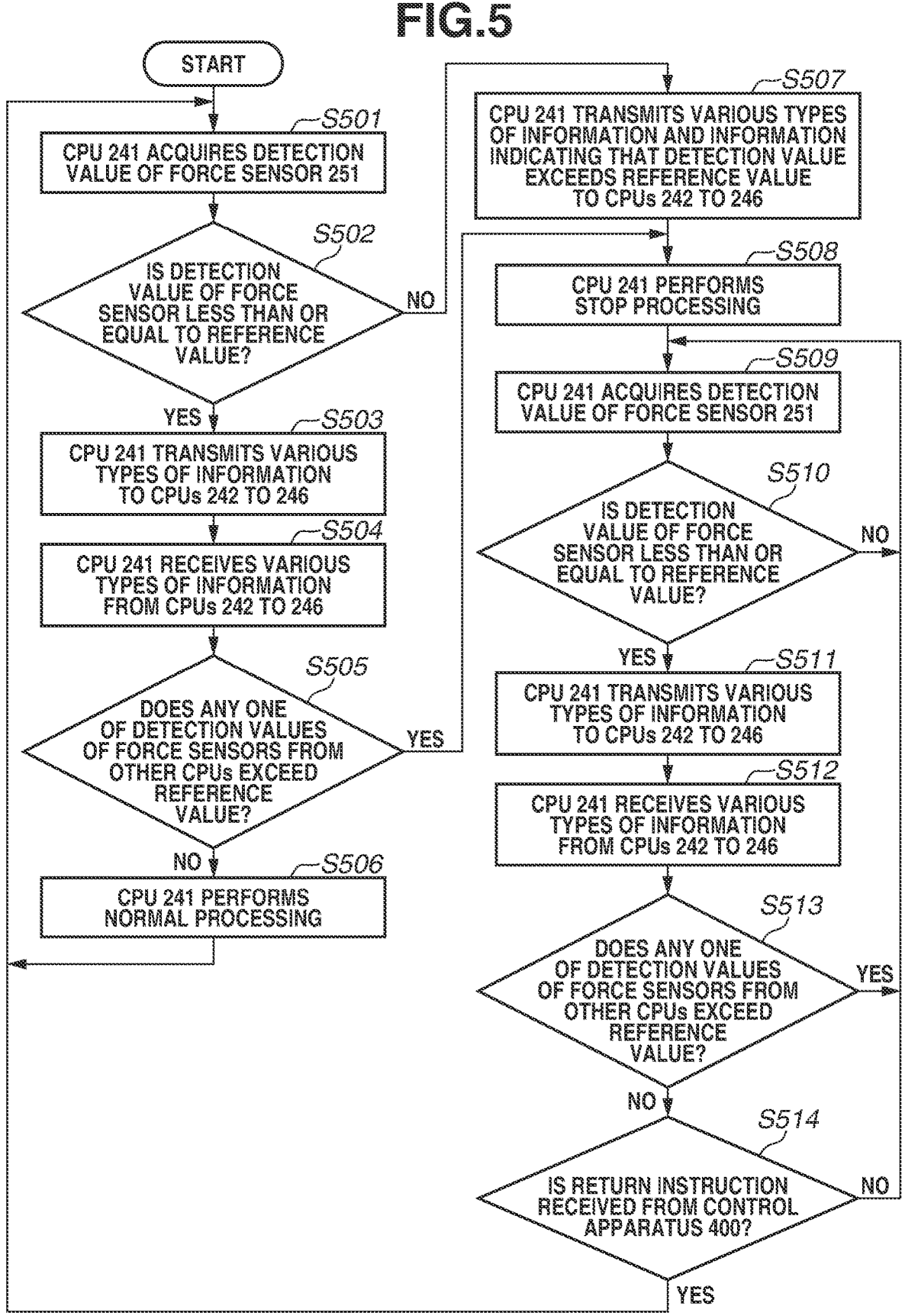
FIG. 5 is a control flowchart according to one or more aspects of the present disclosure.

FIG. 5 is a flowchart according to the present exemplary embodiment. The control flowchart illustrated in FIG. 5 is mainly performed by the CPUs 241 to 246 of the joints J1 to J6. The CPU 401 of the control apparatus 400 transmits a control command to start the control flowchart illustrated in FIG. 5, and the flowchart in FIG. 5 is repeated during the control of the robot arm main body 200.

First, normal processing will be described. While the CPU 241 of the joint J1 will be described as an example, the CPUs 242 to 246 of the other joints J2 to J6 can perform the processing similarly.

In step S501, the CPU 241 acquires a detection value of the force sensor 251 of the joint J1.

In step S502, the CPU 241 compares the detection value of the force sensor 251 acquired in step S501 and the reference value, and determines whether the acquired detection value of the force sensor 251 is within the reference value (or is less than or equal to the reference value). If the detection value of the force sensor 251 is within the reference value (or is less than or equal to the reference value) (YES in step S502), the processing proceeds to step S503. If the detection value of the force sensor 251 is not within the reference value (or is greater than the reference value) (NO in step S502), the processing proceeds to step S507.

In step S503, the CPU 241 transmits various types of information about the joint J1 to the other CPUs 242 to 246. The various types of information include rotation angle information about the arm motor 211 and force information about the force sensor 252.

In step S504, the CPU 241 receives various types of information from the other CPUs 242 to 246. Items of the received information are similar to those transmitted in step S503.

In step S505, the CPU 241 checks whether a notification indicating that a detection value of a force among the information received in step S504 from the other CPUs 242 to 246 exceeds the reference value is received. If a notification indicating that the reference value is exceeded is unreceived (NO in step S505), the processing proceeds to step S506, whereas in a case where a notification indicating that the reference value is exceeded is received (YES in step S505), the processing proceeds to step S508.

In step S506, the CPU 241 performs task processing (normal processing) based on a command from the control apparatus 400 received from the communication line 103. The processing then proceeds to step S501, and the foregoing steps are repeated.

Processing that is to be performed in a case where the robot arm main body 200 is in contact with a nearby predetermined object or a nearby user and a detection value of a force sensor exceeds the reference value will now be described.

In a case where the detection value of the force sensor 251 exceeds the reference value, i.e., the CPU 241 determines that the robot arm main body 200 is in contact with a predetermined object (NO in step S502), the processing proceeds to step S507. In step S507, the CPU 241 transmits information indicating that the reference value is exceeded, to the other CPUs 242 to 246 together with the various types of information, and the processing proceeds to step S508.

In step S508, the CPU 241 performs stop processing. The stop processing can be performed by any methods, such as a method of stopping along a path of a control target, a method of stopping after moving in a direction to avoid receipt of further contact force, a method of stopping at a highest speed possible within a range that a specification of the arm motor 211 allows, and other methods. Similarly, the stop processing of step S508 is performed also in a case where a notification of information indicating that a detection value of a force sensor exceeds the reference value is received from another CPU (YES in step S505).

In step S509, the CPU 241 acquires a detection value of the force sensor 251. This processing is similar to step S501.

In step S510, if the detection value of the force sensor 251 is less than or equal to the reference value (YES in step S510), the processing proceeds to step S511. If a force having a value greater than the reference value is detected (NO in step S510), the processing proceeds to step S509, and a detection value of the force sensor 251 is acquired again.

In step S511, the CPU 241 transmits the acquired various types of information to the other CPUs 242 to 246. The various types of information include rotation angle information about the arm motor 211 and force information about the force sensor 251. While the various types of information are transmitted to the CPUs 242 to 246 in step S511 according to the present exemplary embodiment, a current state of the joint J1 can be transmitted to the CPU 401 using the communication line 104 before step S510. A state of the joint J1 (whether the joint J1 is in a contact state) based on the force sensor 251 and information about the CPU as a transmitter are transmitted to the CPU 401. This enables the CPU 401 to obtain information about a current status of each joint of the robot arm main body 200 and to determine which joint is close to a position where contact occurs to cause a stop and a reason for the stop. This facilitates effective issuance of an instruction to perform a return operation.

In step S512, the CPU 241 receives various types of information from the other CPUs 242 to 246. Items of the received information are similar to those transmitted in step S503 or S511.

In step S513, the CPU 241 checks whether a notification indicating that a detection value of a force among the information received in step S512 from the other CPUs 242 to 246 exceeds the reference value is received. If a notification indicating that the reference value is exceeded is received (YES in step S513), it is determined that the contact state of the robot arm main body 200 is still unsolved, and the processing returns to step S509 to repeat the determination of a detection values of a force sensor while the stop is maintained. In contrast, if a notification indicating that the reference value is exceeded is unreceived (NO in step S513), it is determined that the contact state of the robot arm main body 200 is solved, and the processing proceeds to step S514.

In step S514, the CPU 241 determines whether a return instruction is received from the control apparatus 400. If a return instruction is received from the control apparatus 400 (YES in step S514), the processing proceeds to step S501 to restart the normal operation. In contrast, if a return instruction is unreceived (NO in step S514), the processing returns to step S509 to repeat the determination of a detection value of a force sensor while the stop is maintained until a return instruction is received.

As described above, according to the present exemplary embodiment, in a case where the robot arm main body 200 comes into contact, a CPU of a joint stops the robot arm main body 200 even in the absence of an instruction from the control apparatus 400. Thus, the robot arm main body 200 is stopped promptly, and a robot system with improved responsiveness to external changes is provided. Especially in a case where a predetermined object that is in contact is a user (person), an impact that the user receives is significantly reduced to ensure safety of the user.

Further, the determination of a detection value of a force sensor is performed even while the robot arm main body 200 is stopped, and a return operation is not performed in a case where an instruction to perform the return operation is issued while the user is in contact during the stop. This ensures safety of the user even in returning from the stop of the robot arm main body 200, and the safety is further improved.

According to the first exemplary embodiment, the communication lines 103 and 104 are used during the normal communication state.

In a second exemplary embodiment, an example where the communication line 103 is used in normal communication without using the communication line 104 will be described in detail. Components of configurations of hardware and a control system that are different from those according to the first exemplary embodiment will be described with reference to the drawings. Further, components that are similar to those according to the first exemplary embodiment have configurations and actions that are similar to those described above, and detailed descriptions thereof are omitted.

Figure 6:
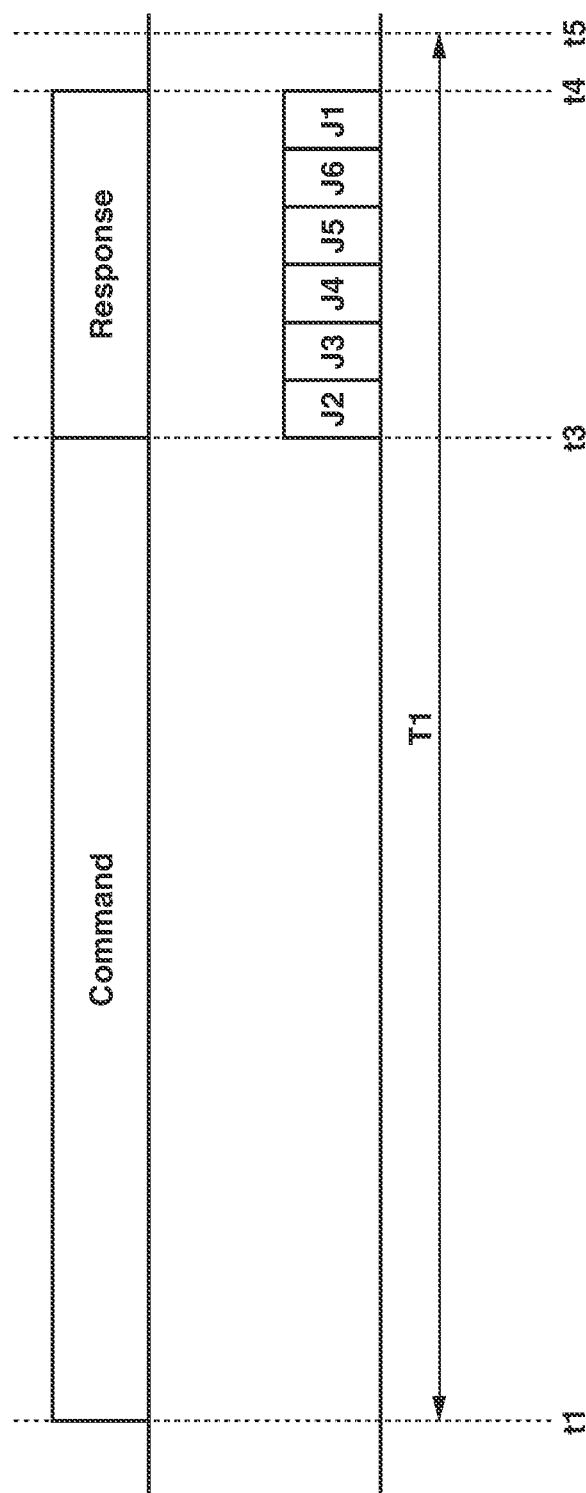
FIGS. 6A and 6B are diagrams illustrating timing charts of communication data exchanged between a CPU and CPUs of joints in a normal communication state according to one or more aspects of the present disclosure.

FIGS. 6A and 6B illustrate timing charts of communication data exchanged between the CPU 401 and the CPUs 241 to 246 of the joints J1 to J6 in the normal communication state according to the present exemplary embodiment. FIG. 6A illustrates the communication between the CPU 401 and the CPUs 241 to 246 of the joints J1 to J6 via the communication line 103. FIG. 6B illustrates timings of communication data between the CPU 401 and the CPUs 241 to 246 of the joints J1 to J6 via the communication line 103.

In FIGS. 6A and 6B, in a case of the normal communication state, the CPU 401 transmits a command to the CPUs 241 to 246 of the joints J1 to J6 and receives information from the CPUs 241 to 246 in response to the transmitted command in a period of T1. From time t1 to time t3, the communication line 103 is used by the CPU 401 for transmitting the command, and the communication line 104 is not used, so that the CPUs 241 to 246 of the joints J1 to J6 remain at a predetermined voltage level in a state of waiting for reception. From time t3 to time t4, the CPUs 241 to 246 of the joints J1 to J6 sequentially transmit to the CPU 401 various types of information acquired by the force sensors 251 to 256 and the encoders using the communication line 103.

Figure 7:
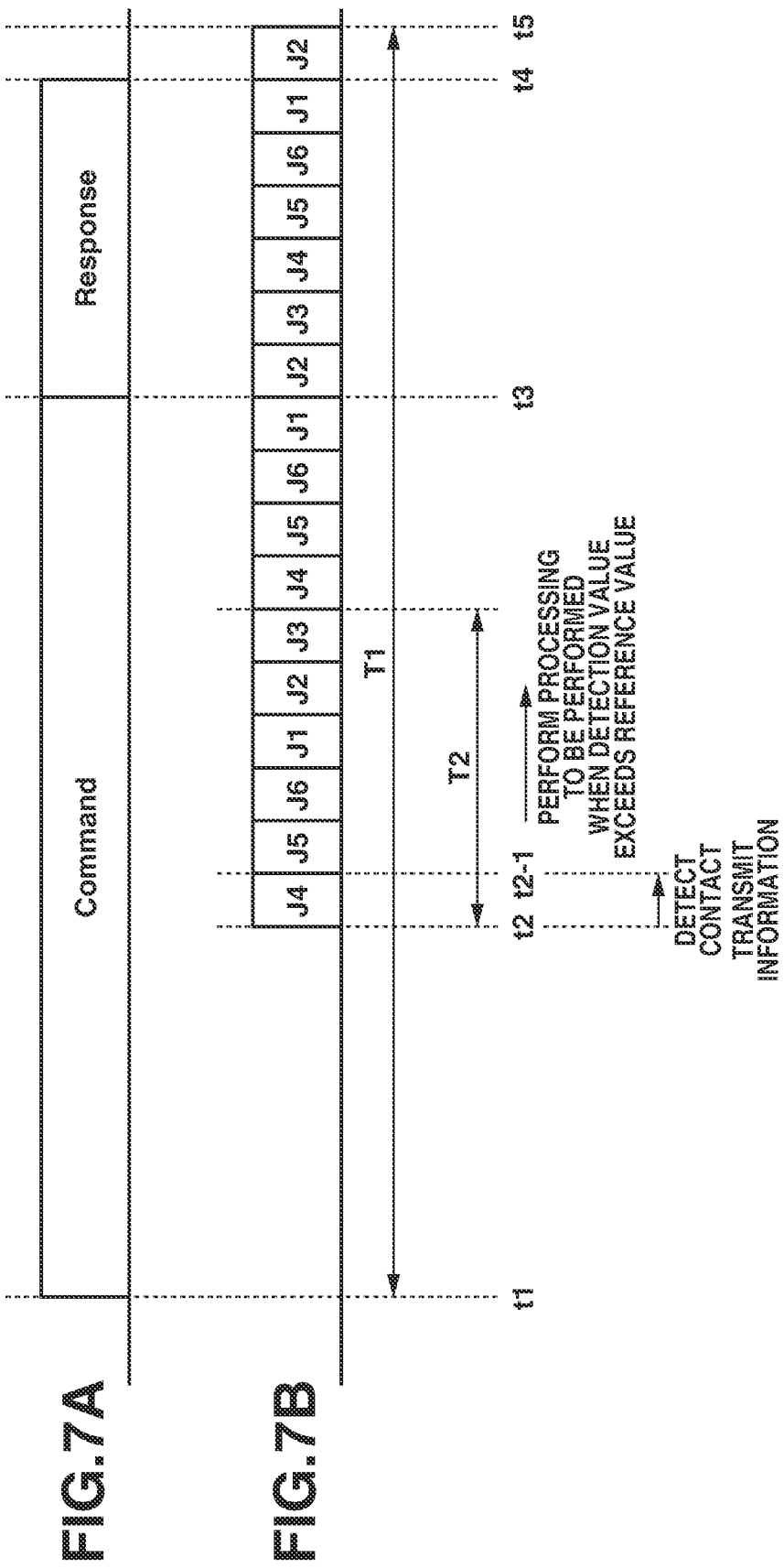
FIGS. 7A and 7B are diagrams illustrating timing charts of communication data exchanged between a CPU and CPUs of joints according to one or more aspects of the present disclosure.

FIGS. 7A and 7B illustrate timing charts of communication data in a case where a detection value of a force sensor exceeds the reference value according to the present exemplary embodiment. FIG. 7A illustrates the communication between the CPU 401 of the control apparatus 400 and the CPUs 241 to 246 of the joints J1 to J6 via the communication line 103. FIG. 7B illustrates timings of communication data between the CPUs 241 to 246 of the joints J1 to J6 via the communication line 103.

In FIG. 7B, the communication using the communication line 104 is not performed from time t1 to time t2. In a case where the CPU 244 of the joint J4 acquires a detection value of the force sensor 254 that exceeds the reference value at time t2, the CPU 244 transmits, using the communication line 104, information indicating that the detection value of the force sensor 254 exceeds the reference value, together with the various types of information, from the communication line 104 to the CPUs 241, 242, 243, 245, and 246 of the other joints J1, J2, J3, J5, and J6. Then, from time t2-1, the CPUs 241, 242, 243, 245, and 246 having received the information indicating that the detection value of the force sensor 254 exceeds the reference value and the CPU 244 perform the processing that is to be performed in a case where the reference value is exceeded. As in the first exemplary embodiment, the processing that is to be performed in a case where a detection value of a force sensor exceeds the reference value is the processing of slowing down the rotations of the arm motors 211 to 216 of the joints J1 to J6 and stopping the arm motors 211 to 216. While the processing that is to be performed in a case where a detection value exceeds the reference value is performed from time t2-1 at which the information transmission is ended according to the present exemplary embodiment, the processing that is to be performed by the CPU 244 in a case where a detection value exceeds the reference value can be performed in parallel with the information transmission.

According to the present exemplary embodiment described above, the robot arm main body 200 in a state where the communication line 104 is not used detects contact during the normal communication. Thus, it is unnecessary to await communication with the communication line 104 according to the present exemplary embodiment. This makes it possible to stop the robot arm main body 200 more promptly compared to the first exemplary embodiment.

According to the first and second exemplary embodiments described above, two systems of the communication lines 103 and 104 are used. In a third exemplary embodiment, a case where a single communication line is used instead of the two communication lines. Components of configurations of hardware and a control system that are different from those according to the above-described exemplary embodiments will be described below with reference to the drawings. Further, components that are similar to those according to the above-described exemplary embodiments have configurations and actions that are similar to those described above, and detailed descriptions thereof are omitted.

Figure 8:
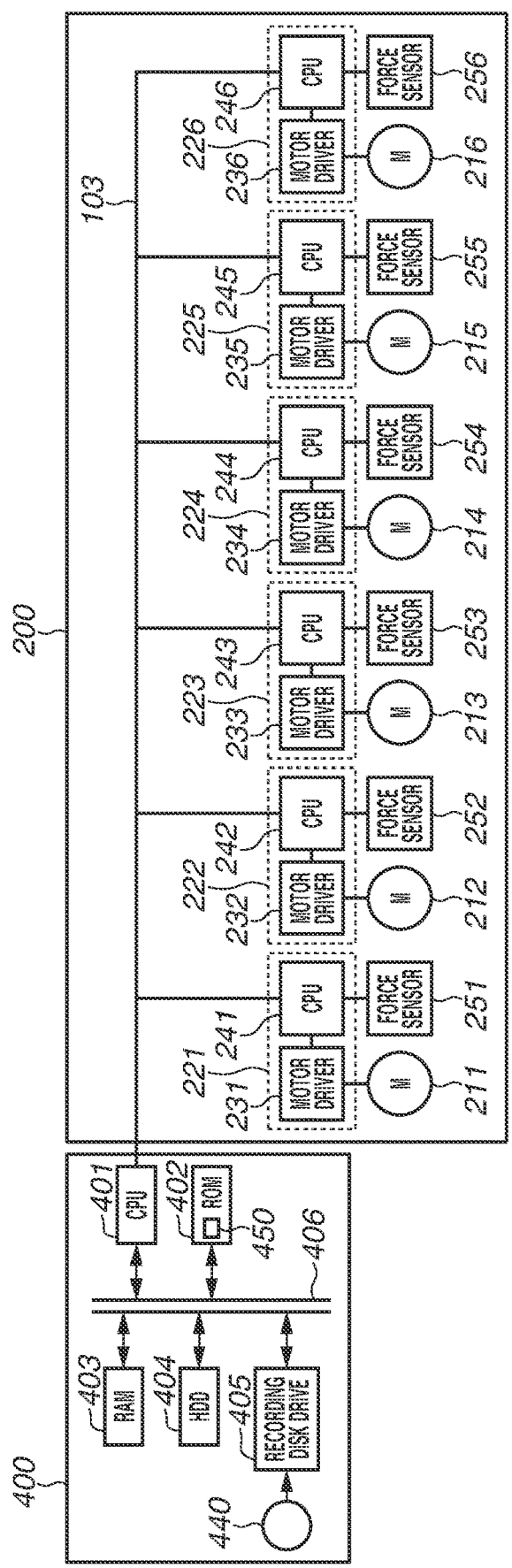
FIG. 8 is a control block diagram illustrating a robot arm main body according to one or more aspects of the present disclosure.

FIG. 8 is a control block diagram illustrating the robot arm main body 200 according to the present exemplary embodiment.

In FIG. 8, there is one communication line, which is the communication line 103, according to the present exemplary embodiment while there are two systems of communication lines, which are the communication lines 103 and 104, according to the above-described exemplary embodiments.

The arm motors 211 to 216, the arm motor control devices 221 to 226, the motor drivers 231 to 236, the CPUs 241 to 246, and the force sensors 251 to 256 are similar to those according to the above-described exemplary embodiments.

Figure 9:
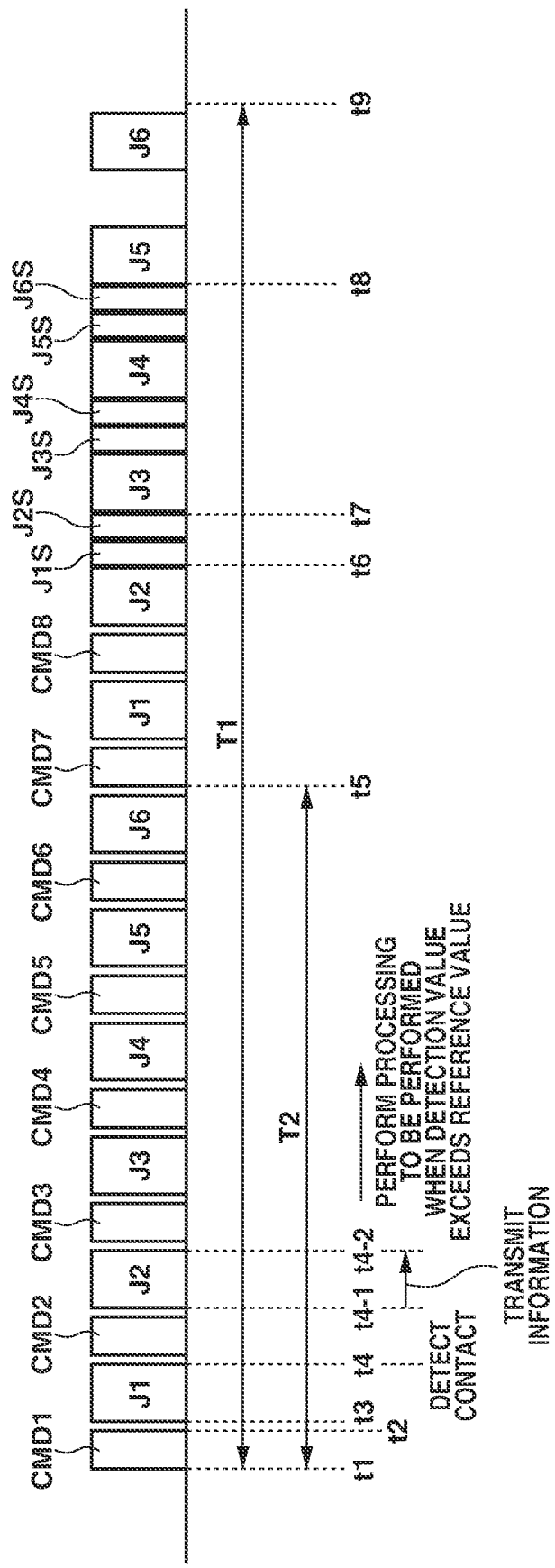
FIG. 9 is diagram illustrating a timing chart of communication data exchanged between a CPU and CPUs of joints according to one or more aspects of the present disclosure.

FIG. 9 illustrates timing charts of communication data exchanged between the CPU 401 and the CPUs 241 to 246 of the joints J1 to J6 according to the present exemplary embodiment. According to the present exemplary embodiment, the information transmitted via the communication lines 103 and 104 according to the first and second exemplary embodiments is multiplexed, and the multiplexed information is communicated via the communication line 103. The multiplexing and demultiplexing processing are performed by the control apparatus 400 and the arm motor control devices 221 to 226. In FIG. 9, commands CMD1 to CMD8 indicate commands that are multiplexed in transmitting the commands to the CPUs 241 to 246 of the joints J1 to J6 by the CPU 401 of the control apparatus 400. The multiplexing refers to performing time-division on command information and the communicating of the resulting command information and other communication information alternately.

J1S to J6S denote timings for the CPUs 241 to 246 to transmit various types of information J1S to J6S to the CPU 401. J1 to J6 denote timings to transmit data between the CPUs 241 to 246. Two communication systems are multiplexed: one communication system is a communication system in which the transmission and reception of the commands CMD1 to CMD8 and the various types of information J1S to J6S are repeated with the period of T1 between the CPU 401 and the CPUs 241 to 246, and another communication system is a communication system in which the transmission and reception of the various types of information J1 to J6 are repeated with the period T2 between the CPUs 241 to 246. The communication system for the commands CMD1 to CMD8 and the various types of information J1S to J6S that are repeated with the period T1 will be referred to as "main communication", and the communication system for the various types of information J1 to J6 that are repeated with the period of T2 will be referred to as "sub-communication".

In FIG. 9, the main communication is performed from time t1 to time t2. The CPU 401 transmits the command CMD1 to the CPUs 241 to 246 of the joints J1 to J6. In FIG. 9, commands are multiplexed, and a command is divided into eight pieces, and these pieces are transmitted using time-division method.

Next, the sub-communication is performed from time t3 to time t4. The CPU 241 transmits one of the various types of information J1 to the CPUs 242, 243, 244, 245, and 246 of the other joints J2, J3, J4, J5, and J6. Thereafter, the main communication and the sub-communication are multiplexed, and data is transmitted alternately.

Next, during the transmission period T1 of the main communication, the CPUs 241 to 246 respond with the various types of information J1S to J6S. According to the present exemplary embodiment, the CPUs 241 and 242 respond to the commands from the CPU 401 during a period from time t6 to time t7. Thereafter, the various types of information J3S to J6S of the CPUs 243 to 246 are transmitted before time t8. From time t9, the CPU 401 repeatedly performs a command transmission and reception process of a next period.

At time t4, it is assumed that the CPU 242 of the joint J2 acquires a detection value of the force sensor 252 that exceeds the reference value. At time t4-1, the CPU 242 transmits information indicating that the detection value of the force sensor 252 has exceeded the reference value, together with the various types of information, to the CPUs 241, 243, 244, 245, and 246 of the other joints J1, J3, J4, J5, and J6 using the sub-communication. From time t4-2, the CPUs 241, 243, 244, 245, and 246 having received the information indicating that the detection value of the force sensor 252 exceeds the reference value and the CPU 242 perform the processing that is to be performed in a case where a detection value exceeds the reference value. According to the present exemplary embodiment, in a case where a detection value exceeds the reference value, the arm motors 211 to 216 of the joints J1 to J6 are slowed down and stopped. While the processing that is to be performed in a case where a detection value exceeds the reference value is performed from time t4-2 at which the information transmission is ended, the processing that is to be performed by the CPU 242 when a detection value exceeds the reference value can be performed in parallel with the information transmission, according to the present exemplary embodiment.

According to the present exemplary embodiment described above, the robot arm main body 200 detects contact using the single communication line. This reduces communication line costs compared to a case where there is a plurality of communication lines, and the stop processing is performed promptly and safely using the single communication line.

While the sub-communication is used in the example according to the third exemplary embodiment, the present disclosure is not limited to those described above. According to a fourth exemplary embodiment, a case will be described where contact is detected with the configuration according to the third exemplary embodiment in a state where the sub-communication is not performed in the normal communication state. Components of configurations of hardware and a control system that are different from those according to the above-described exemplary embodiments will be described below with reference to the drawings. Components that are similar to those according to the above-described exemplary embodiments have configurations and actions that are similar to those described above, and thus detailed descriptions thereof are omitted.

Figure 10:
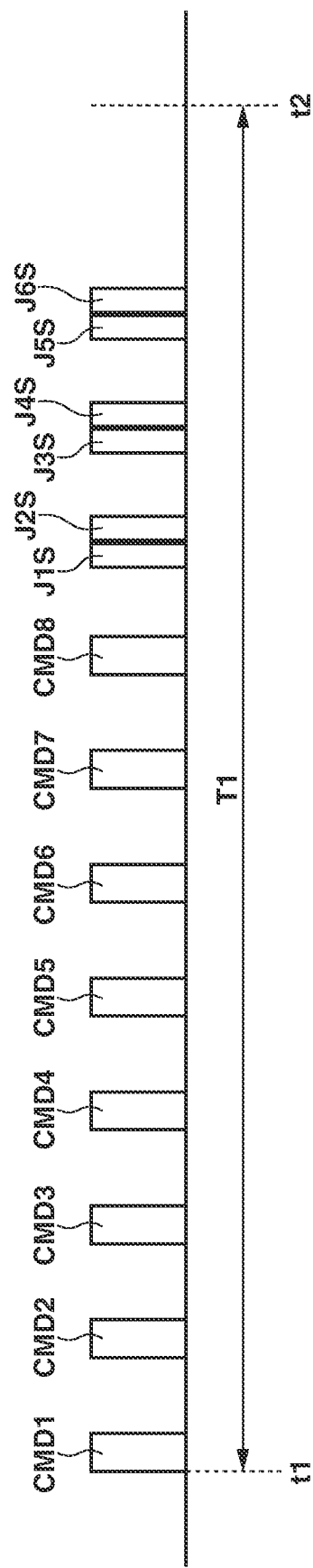
FIG. 10 is a diagram illustrating a timing chart of communication data exchanged between a CPU and CPUs of joints in a normal communication state according to one or more aspects of the present disclosure.

FIG. 10 illustrates timings of communication data exchanged between the CPU 401 and the CPUs 241 to 246 of the joints J1 to J6 in the normal communication state according to the present exemplary embodiment. Whether to perform the sub-communication is selected using a command transmitted from the control apparatus 400 to the CPUs 241 to 246. In FIG. 10, the time-division commands CMD1 to CMD8 are transmitted using the communication from the CPU 401 of the control apparatus 400 to the CPUs 241 to 246, which is the main communication, and thereafter the CPUs 241 to 246 transmit the various types of information J1S to J6S to the CPU 401. The main communication is repeated with a period of T1 similarly to the third exemplary embodiment. In a case where the sub-communication is not performed, the CPUs 241 to 246 remain at a predetermined voltage level in a state of waiting for reception during the sub-communication period, as illustrated in FIG. 10.

Figure 11:
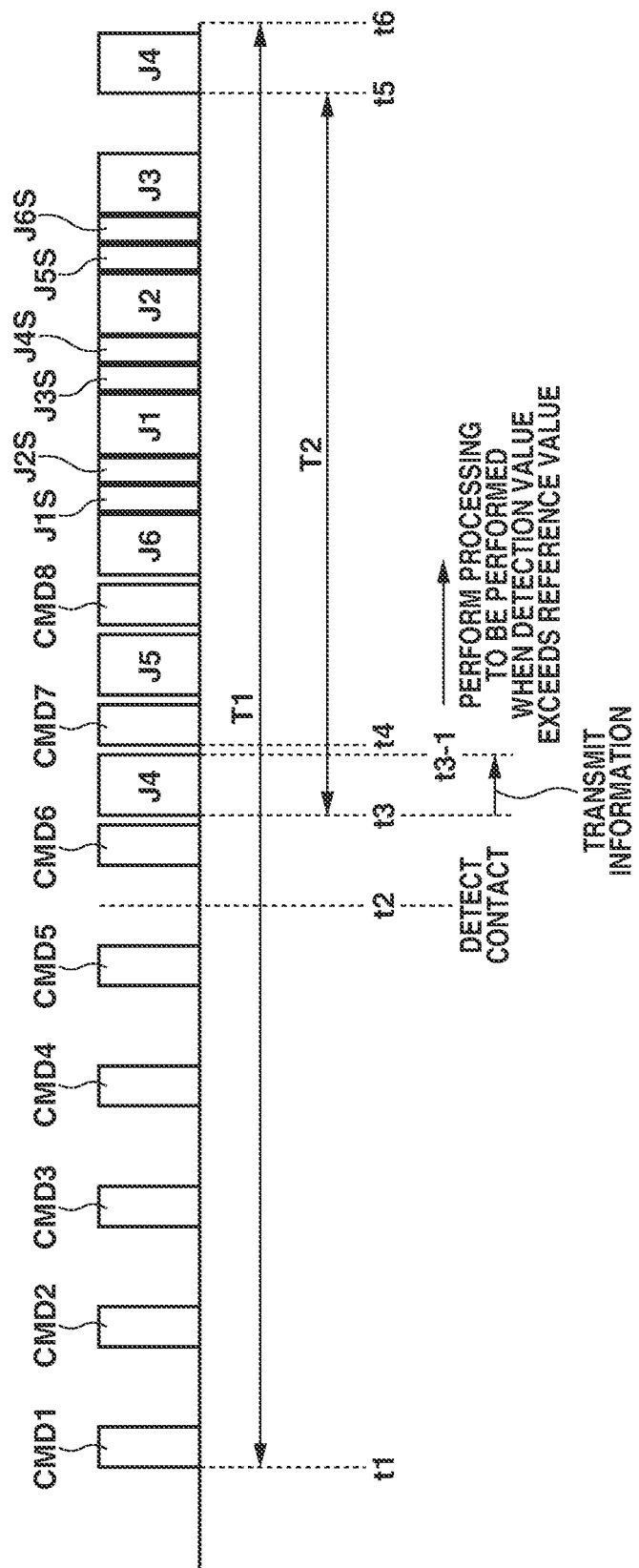
FIG. 11 is diagram illustrating a timing chart of communication data exchanged between a CPU and CPUs of joints according to one or more aspects of the present disclosure.

FIG. 11 is a timing chart illustrating timings of communication data in a case where a detection value of a force sensor exceeds the reference value in the state illustrated in FIG. 10. The time-division main communication from the CPU 401 to the CPUs 241 to 246 is repeated with the period T1.

As illustrated in FIG. 11, operations similar to those in FIG. 10 are performed before time t2 as an example of the present exemplary embodiment, and at time t2, it is assumed that the CPU 244 acquires a detection value that exceeds the reference value from the force sensor 254. Then, at time t3, the sub-communication is performed, and the CPU 244 transmits information indicating that the detection value of the force sensor 254 has exceeded the reference value, together with various types of information, from the communication line 104 to the CPUs 241, 242, 243, 245, and 246 of the other joints J1, J2, J3, J5, and J6.

Then, from time t3-1, the other CPUs 241, 242, 243, 245, and 246 having received the information indicating that the detection value of the force sensor 254 has exceeded the reference value and the CPU 244 perform the processing that is to be performed when a detection value exceeds the reference value. According to the present exemplary embodiment, in a case where a detection value exceeds the reference value, the arm motors 211 to 216 of the joints J1 to J6 are slowed down and stopped. While the processing that is to be performed when a detection value exceeds the reference value is performed from time t3-1 at which the information transmission is ended, the processing that is to be performed by the CPU 244 when a detection value exceeds the reference value can be performed in parallel with the information transmission, according to the present exemplary embodiment.

As described above, according to the present exemplary embodiment, the robot arm main body 200 detects contact in a state where the sub-communication is not performed in the normal communication. It is thereby unnecessary to await the sub-communication, according to the present exemplary embodiment. This makes it possible to stop the robot arm main body 200 more promptly compared to the third exemplary embodiment, accordingly.

While a case where the robot arm main body 200 and a predetermined object are in contact with each other is described as an example of a predetermined state where an external change occurs according to the above-described exemplary embodiments, the present disclosure is not limited to those described above. A case where a failure of the robot arm main body 200 is detected as a predetermined state where an external change occurs according to a fifth exemplary embodiment will be described below. Components of configurations of hardware and a control system that are different from those according to the above-described exemplary embodiments will be described below with reference to the drawings. Components that are similar to those according to the above-described exemplary embodiments have configurations and actions that are similar to those described above, and detailed descriptions thereof are omitted.

Figure 12:
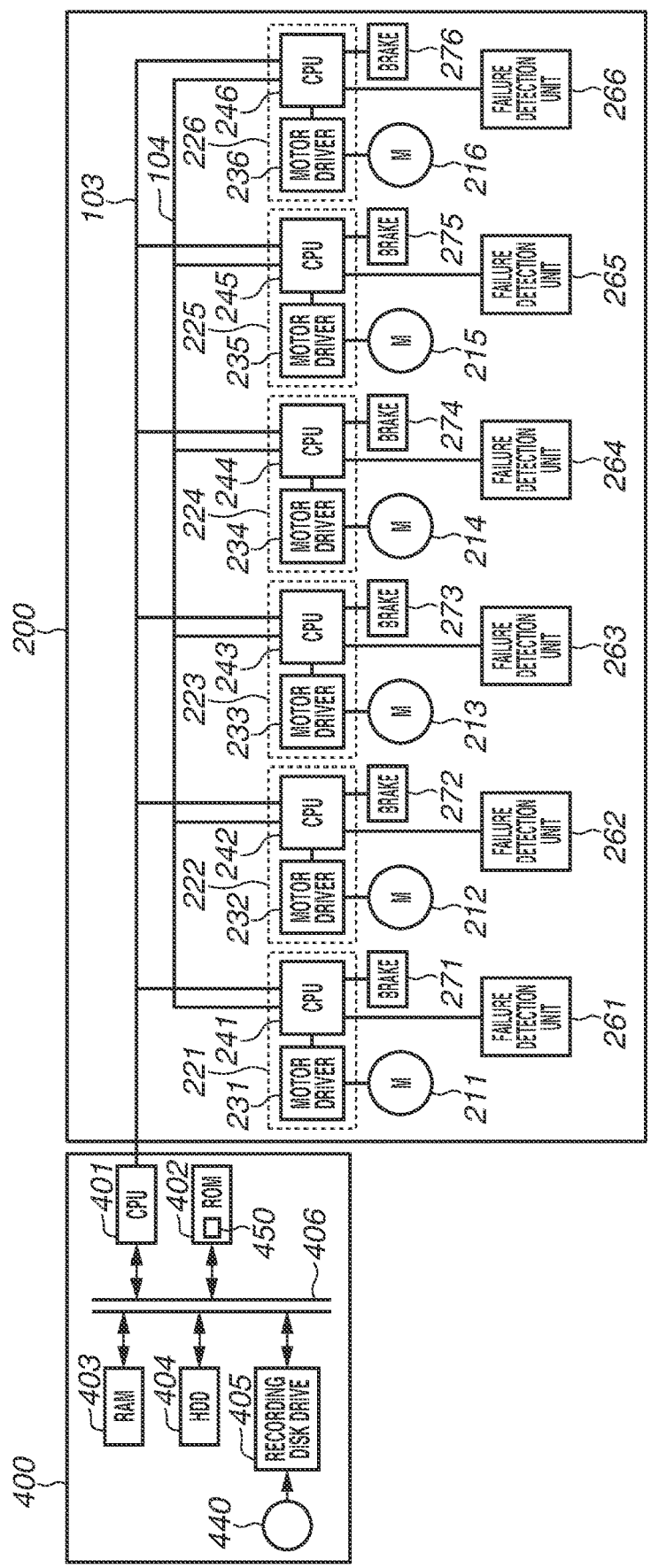
FIG. 12 is a control block diagram illustrating a robot arm main body according to one or more aspects of the present disclosure.

FIG. 12 is a control block diagram illustrating the robot arm main body 200 according to the present exemplary embodiment. The joints J1 to J6 respectively include the arm motors 211 to 216, the arm motor control devices 221 to 226, the motor drivers 231 to 236, the CPUs 241 to 246, failure detection units 261 to 266, and brakes 271 to 276.

The failure detection units 261 to 266 are sensors that periodically detect the presence or absence of a disconnection of wiring as a device of the robot main body or an irreversible failure such as a breakage of a speed reduction mechanism (not illustrated) and notify the connected CPUs 241 to 246 of the presence or absence of a failure. If a failure is detected, the CPUs 241 to 246 operate the brakes 271 to 276 to stop the arm motors 211 to 216 physically.

Figure 13:
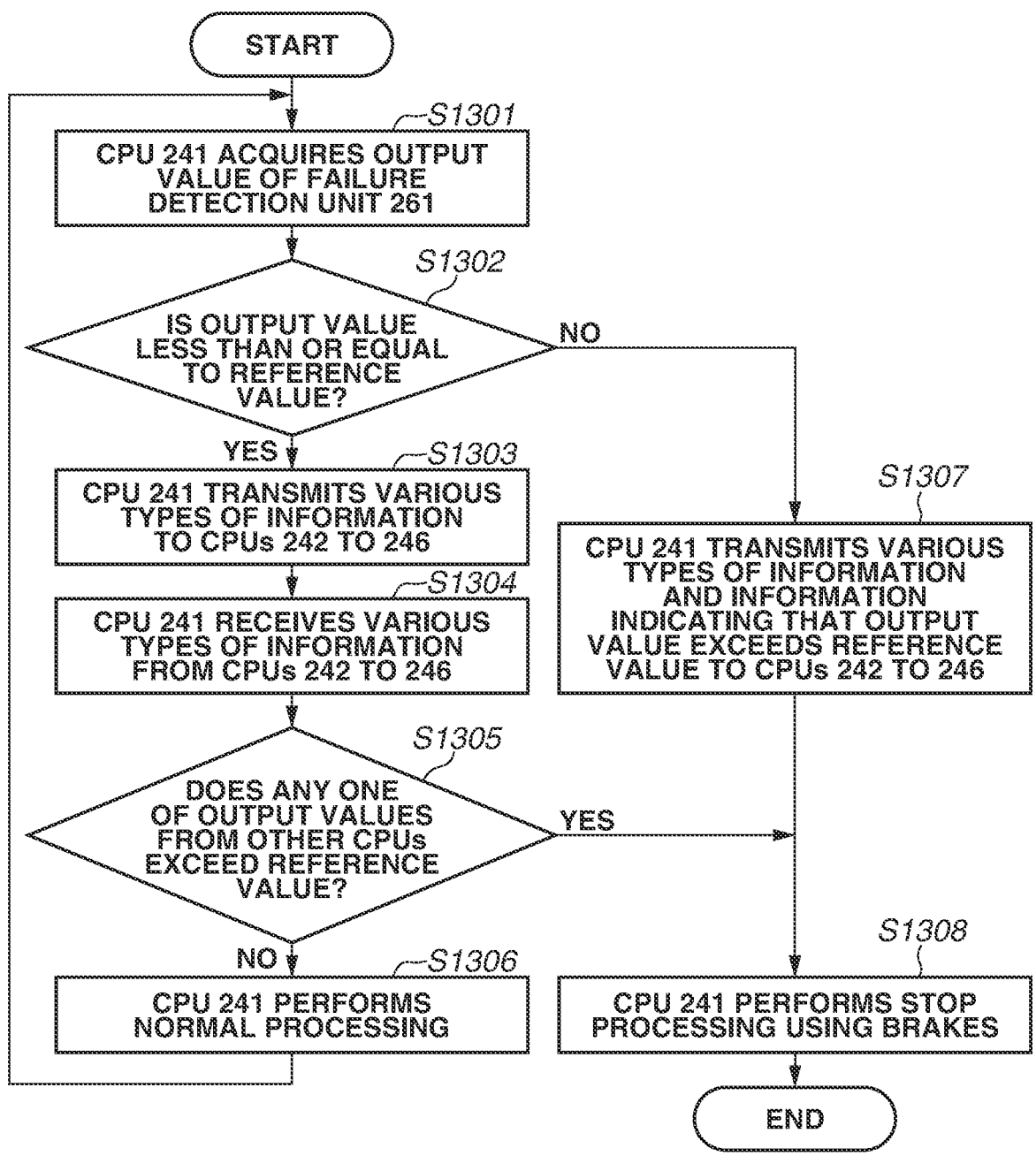
FIG. 13 is a control flowchart according one or more aspects of the present disclosure.

FIG. 13 is a flowchart according to the present exemplary embodiment. The control flowchart in FIG. 13 is performed mainly by the CPUs 241 to 246 of the joints J1 to J6.

Normal processing will now be described. While the CPU 241 of the joint J1 will be described as an example, the CPUs 242 to 246 of the other joints J2 to J6 can perform the processing similarly.

In step S1301, the CPU 241 acquires an output value from the failure detection unit 261 of the joint J1.

In step S1302, the CPU 241 compares the output value of the failure detection unit 261 that is acquired in step S1301 and the reference value, and determines whether the acquired output value of the failure detection unit 261 is within the reference value (whether the acquired output value of the failure detection unit 261 is less than or equal to the reference value). If the output value of the failure detection unit 261 is within the reference value (less than or equal to the reference value), the processing proceeds to step S1303. If the output value of the failure detection unit 261 is not within the reference value (greater than the reference value), the processing proceeds to step S1307.

In step S1303, the CPU 241 transmits various types of information about the joint J1 to the other CPUs 242 to 246. The various types of information include rotation angle information about the arm motor 211 and output value information about the failure detection unit 261.

In step S1304, the CPU 241 receives various types of information from the other CPUs 242 to 246. Items of the received information are similar to those transmitted in step S1303.

In step S1305, the CPU 241 checks whether a notification indicating that an output value of a failure detection unit 261 among the information received in step S1304 from the other CPUs 242 to 246 exceeds the reference value is received. If a notification indicating that the reference value is exceeded is unreceived (NO in step S1305), the processing proceeds to step S1306. If a notification indicating that the reference value is exceeded is received (YES in step S1305), the processing proceeds to step S1308.

In step S1306, the CPU 241 performs task processing (normal processing) based on a command from the control apparatus 400 that is received from the communication line 103. The processing then proceeds to step S1301 to repeat the foregoing processing.

Processing that is to be performed if a failure of the robot arm main body 200 is detected and an output value of a failure detection unit exceeds the reference value will be described below.

If the output value of the failure detection unit 261 exceeds the reference value (NO in step S1302), i.e., the CPU 241 determines that a failure has occurred, the processing proceeds to step S1307. In step S1307, the CPU 241 transmits information indicating that the reference value is exceeded, together with the various types of information, to the other CPUs 242 to 246, and the processing proceeds to step S1308. Similarly, even if information indicating that the reference value is exceeded is transmitted from another CPU (YES in step S1305), the processing proceeds to step S1308.

In step S1308, the CPU 241 performs stop processing using the brakes 271 to 276. The stop processing using the brakes 271 to 276 is the processing of slowing down and stopping the arm motors 211 to 216 and then preventing the arm motors 211 to 216 from operating by a control signal or an external force using the brakes 271 to 276. The slowing down and stopping can be the processing of stopping the operable arm motors 211 to 216 along a path of a control target, the processing of moving the operable arm motors 211 to 216 in a direction to avoid receipt of further contact force to stop the operable arm motors 211 to 216, or the processing of stopping the operable arm motors 211 to 216 at a highest speed possible within a range that specifications of the arm motors 211 to 216 allow, or any other methods can be used. After the arm motors 211 to 216 stop rotating, the rotations of the arm motors 211 to 216 are fixed by the brakes 271 to 276 to prevent the robot arm main body 200 from operating.

As described above, the stop processing is started promptly in a case where a failure of the robot arm main body 200 occurs, according to the present exemplary embodiment. Thus, when an irreversible failure occurs, the robot arm main body 200 is stopped promptly and is prevented from operating using the brakes 271 to 276 so that the robot arm main body 200 is stopped promptly without continuing to operate in the failure state, thereby ensuring safety of the user.

Next, the control apparatus 400 including a CPU 1401 different from the CPU 401 according to an exemplary embodiment will now be described in detail. Components of configurations of hardware and a control system that are different from those according to the above-described exemplary embodiments will be described below with reference to the drawings. Further, components that are similar to those according to the above-described exemplary embodiments have configurations and actions that are similar to those described above, and detailed descriptions thereof are omitted. The CPU 401 may also referred to as "first processing unit", and the CPU 1401 may also referred to as "second processing unit".

Figure 14:
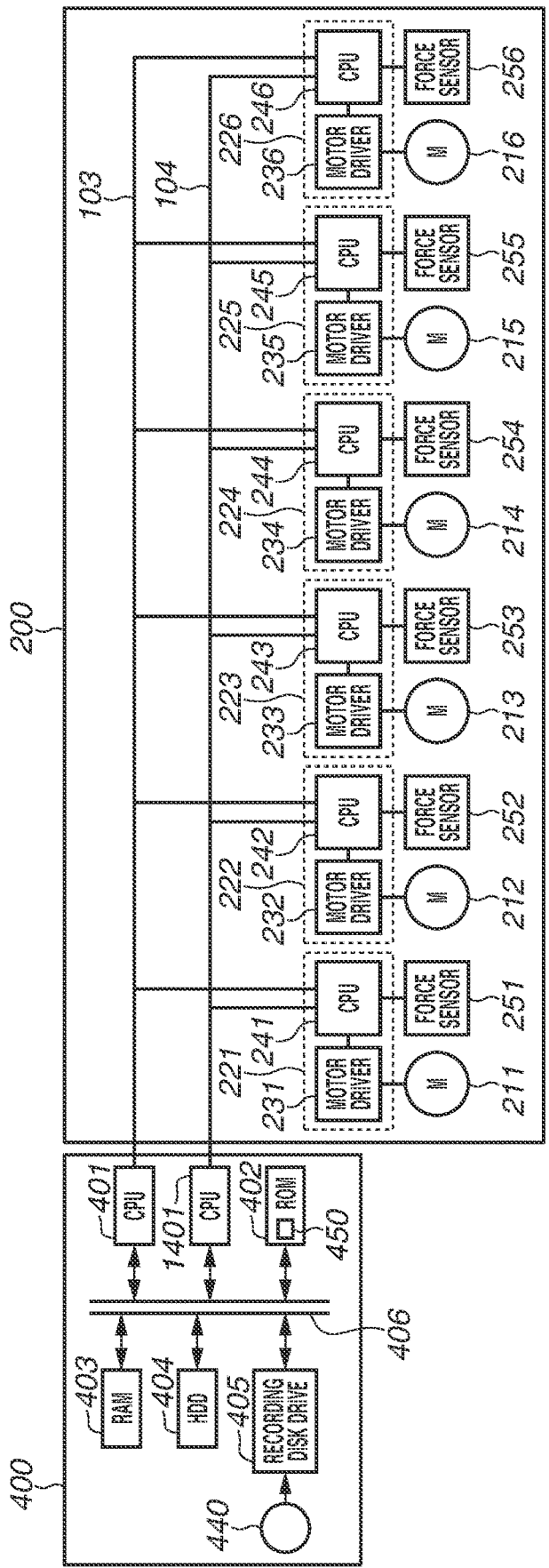
FIG. 14 is a control block diagram illustrating a robot arm main body according to one or more aspects of the present disclosure.

FIG. 14 is a control block diagram illustrating the robot arm main body 200 according to a sixth exemplary embodiment. In FIG. 14, the control apparatus 400 includes the built-in CPU 1401 in addition to the CPU 401. The CPUs 401 and 1401 can be separate cores or can be a single multi-core to which functions of the CPUs 401 and CPU 1401 are implemented. The CPU 1401 monitors values of the force sensors 251 to 256 of the robot arm main body 200 via the communication line 104. While the CPU 1401 monitors the force sensors 251 to 256 through the CPUs 241 to 246, the CPU 1401 can also monitor information about the other motors 211 to 216. Information about the force sensors 251 to 256 is received via the communication line 104 and is compared with the reference value that is preset. Further, the comparison result can be transmitted to and received from the CPU 401 via the bus 406. A communication period of the CPU 1401 and the CPUs 241 to 246 using the communication line 104 is shorter than a communication period of the CPU 401 and the CPUs 241 to 246 using the communication line 103. Further, the CPU 1401 can transmit a stop instruction to the CPUs 241 to 246 based on a comparison between values of the force sensors 251 to 256 and the reference value.

Figure 15:
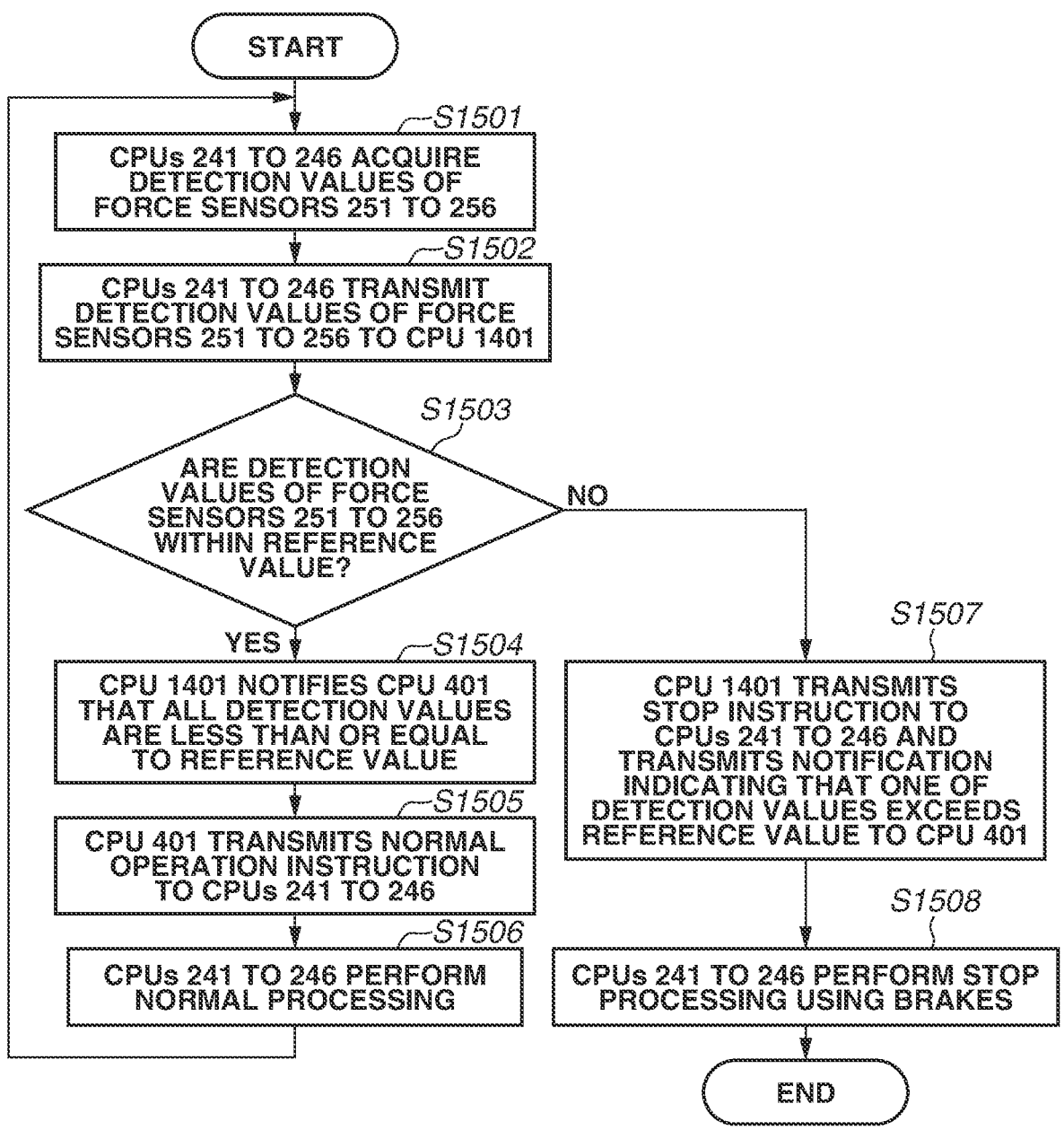
FIG. 15 is a control flowchart according to one or more aspects of the present disclosure.

FIG. 15 is a control flowchart according to the present exemplary embodiment. The control flowchart in FIG. 15 is performed mainly by the CPU 1401, the CPU 401, and the CPUs 241 to 246 of the joints J1 to J6 in collaboration with each other.

In step S1501, the CPUs 241 to 246 acquire detection values of the force sensors 251 to 256. In step S1502, the CPUs 241 to 246 transmit the detection values of the force sensors 251 to 256 that are acquired in step S1501 to the CPU 1401 via the communication line 104.

In step S1503, the CPU 1401 compares the detection values of the force sensors 251 to 256 that are acquired in step S1502 and the reference value, and determines whether the acquired detection values of the force sensors 251 to 256 are within the reference value (less than or equal to the reference value). If the detection values of the force sensors 251 to 256 are within the reference value (YES in step S1503), the processing proceeds to step S1504. If at least one of the detection values of the force sensors 251 to 256 is not within the reference value (NO in step S1503), the processing proceeds to step S1507. While a case where at least one of the detection values is not within the reference value is described according to the present exemplary embodiment, the condition can be set as appropriate, e.g., two or three of the detection values.

In step S1504, the CPU 1401 notifies (transmits a notification to) the CPU 401 that the detection values of the force sensors 251 to 256 are within the reference value.

In step S1505, the CPU 401 transmits a normal operation instruction to the CPUs 241 to 246. In step S1506, the CPUs 241 to 246 perform the normal processing based on the operation instructions received in step S1505. Then, the processing returns to step S1501 to repeat the control flow described above.

In step S1507, the CPU 1401 transmits a stop instruction to the CPUs 241 to 246 via the communication line 104. Further, together with the transmission of the stop instruction, the CPU 401 is notified (or a notification is transmitted to the CPU 401) that one of the detection values of the force sensors 251 to 256 exceeds the reference value. Since the communication period using the communication line 104 is shorter than the communication period using the communication line 103, a stop instruction is transmitted to the CPUs 241 to 246 faster than a case where a stop instruction is output via the CPU 401.

In step S1508, the CPUs 241 to 246 perform stop processing using the brakes 271 to 276. The stop processing using the brakes 271 to 276 is the processing of slowing down and stopping the arm motors 211 to 216 and then preventing the arm motors 211 to 216 from operating by a control signal and an external force using the brakes 271 to 276. The slowing down and stopping can be the processing of stopping the operable arm motors 211 to 216 along a path of a control target, the processing of moving the operable arm motors 211 to 216 in a direction to avoid receipt of further contact force to stop the operable arm motors 211 to 216, or the processing of stopping the operable arm motors 211 to 216 at a highest speed possible within a range that specifications of the arm motors 211 to 216 allow, or any other methods can be used. After the arm motors 211 to 216 stop rotating, the rotations of the arm motors 211 to 216 are fixed by the brakes 271 to 276 to prevent the robot arm main body 200 from operating. While the stop processing is performed by the CPU 1401 according to the present exemplary embodiment, the CPUs 241 to 246 can perform the stop processing.

As described above, the CPU 1401 is included, and the CPU 1401 mainly monitors the force sensors 251 to 256 and performs communication with a shorter communication period than the communication period of the CPU 401, according to the present exemplary embodiment. In a case where the robot arm main body 200 comes into contact, the CPU 1401 with a short communication period can thus stop the robot arm main body 200 even in the absence of an instruction from the CPU 401. The robot arm main body 200 can thereby be stopped promptly, and a robot system with improved responsiveness to external changes is provided. Especially in a case where a predetermined object that is in contact is a user (person), an impact that the user receives is significantly reduced to ensure safety of the user.

A case where wireless communication 105 is used in place of the communication line 103 according to an exemplary embodiment will now be described in detail. According to a seventh exemplary embodiment, the communication line 103 is not provided in the robot arm main body 200. Instead, the CPU 401 and the CPUs 241 to 246 communicate with each other via wireless devices 1601 to 1608. Components of configurations of hardware and a control system that are different from those according to the above-described exemplary embodiments will be described below with reference to the drawings. Further, components that are similar to those according to the above-described exemplary embodiments have configurations and actions that are similar to those described above, and detailed descriptions thereof are omitted. Further, the CPU 401 may also be referred to as "first processing unit", and the CPU 1401 may also be referred to as "second processing unit".

Figure 16:
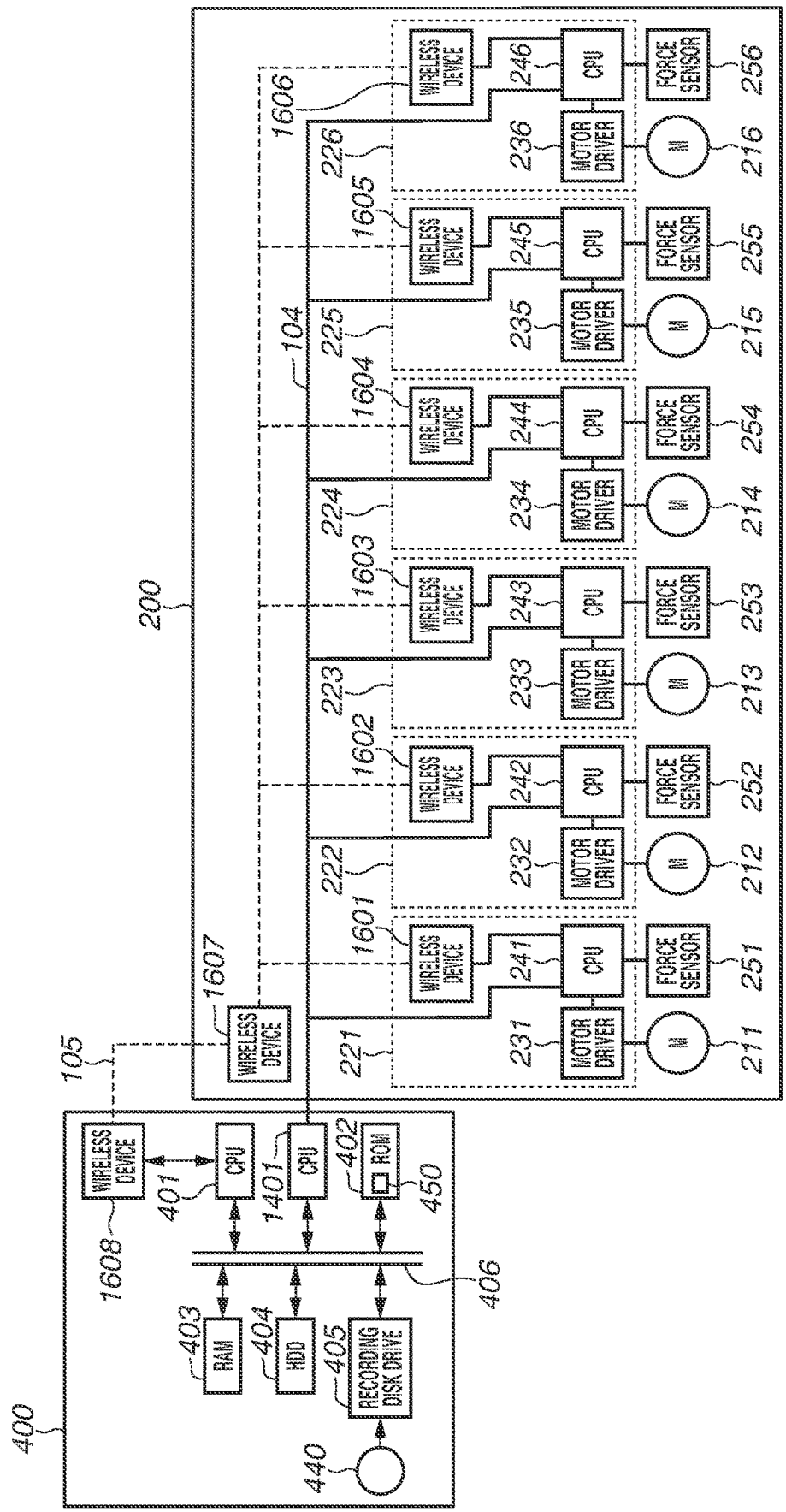
FIG. 16 is a control block diagram illustrating a robot arm main body according to one or more aspects of the present disclosure.

FIG. 16 is a control block diagram illustrating the robot arm main body 200 according to the present exemplary embodiment. As illustrated in FIG. 16, the arm motor control devices 221 to 226 respectively include the wireless devices 1601 to 1606, and the wireless devices 1601 to 1606 are respectively connected to the CPUs 241 to 246. Further, the robot arm main body 200 includes the wireless device 1607, and the wireless device 1607 comprehensively controls the wireless devices 1601 to 1606 to perform wireless communication. The control apparatus 400 includes the wireless device 1608, and the wireless device 1608 wirelessly communicates with the wireless device 1607 and is connected to the CPU 401. The CPU 401 communicates with the CPUs 241 to 246 via the wireless communication 105 via the wireless devices 1601 to 1608.

Figure 17:
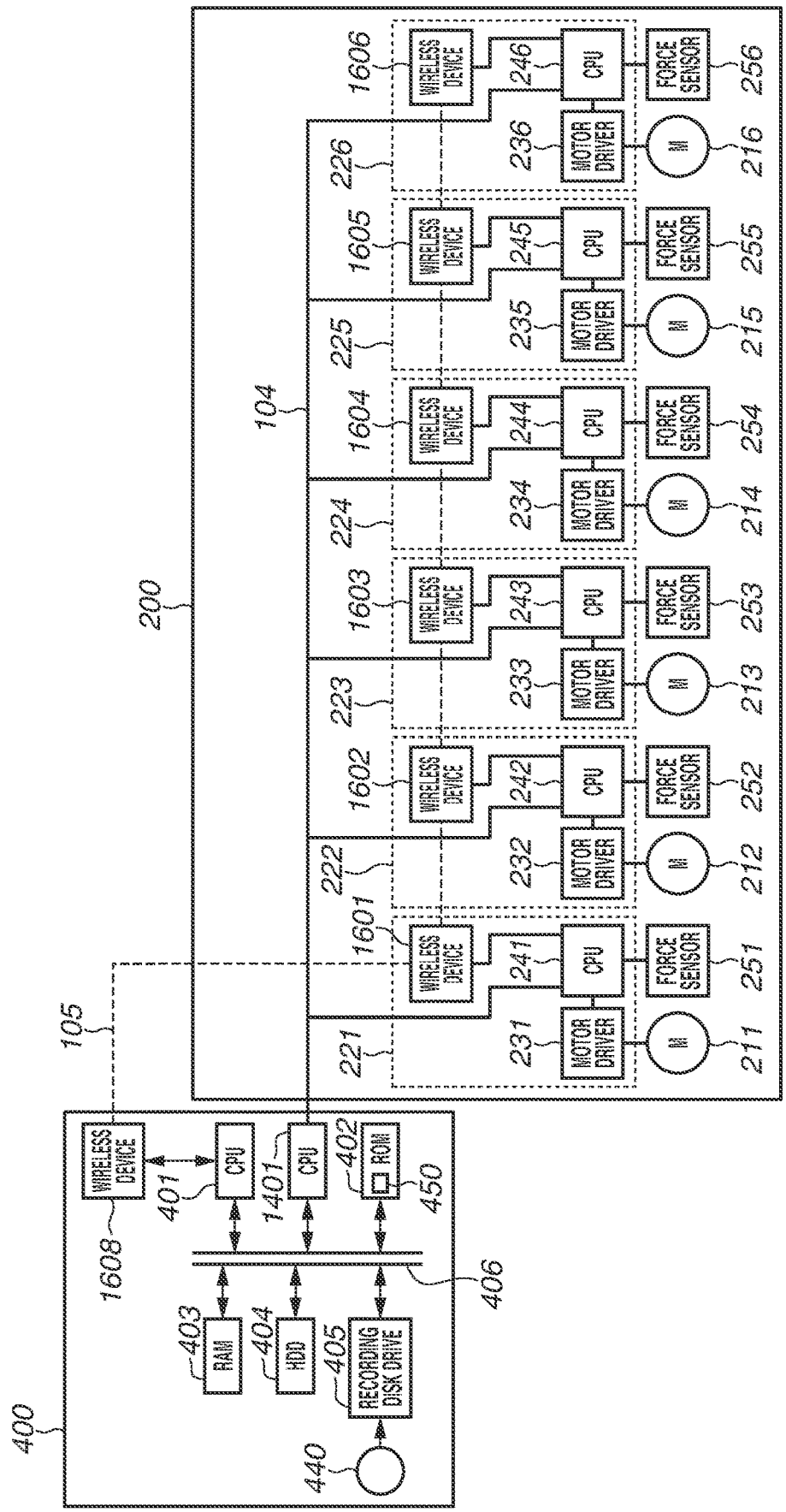
FIG. 17 is a control block diagram illustrating a robot arm main body according to one or more aspects of the present disclosure.

The wireless communication 105 can also be formed as illustrated in FIG. 17 as a modified example. FIG. 17 is a control block diagram illustrating the robot arm main body 200 according to the modified example of the present exemplary embodiment. In FIG. 17, the wireless device 1607 in FIG. 16 is omitted, and the wireless device 1608 is connected to the wireless device 1601. Further, the wireless devices 1601 to 1606 are directly connected together. The CPUs 241 to 246 can wirelessly communicate with each other directly as described above and can wirelessly communicate with the CPU 401.

The CPU 1401 monitors values of the force sensors 251 to 256 of the robot arm main body 200 via the communication line 104. While the CPU 1401 monitors the force sensors 251 to 256 through the CPUs 241 to 246 according to the present exemplary embodiment, the CPU 1401 can monitor other information such as information about the motors 211 to 216. Information about the force sensors 251 to 256 is received via the communication line 104 and is compared with the reference value that is preset. Further, the comparison result can be transmitted to and received from the CPU 401 via the bus 406. A communication period of the CPU 1401 and the CPUs 241 to 246 using the communication line 104 is shorter than a communication period of the CPU 401 and the CPUs 241 to 246 using the wireless communication 105. Further, the CPU 1401 can transmit a stop instruction to the CPUs 241 to 246 based on a comparison result between values of the force sensors 251 to 256 and the reference value. A processing flow of controlling the stop processing on the robot arm main body 200 is similar to FIG. 15, so that redundant descriptions thereof are omitted. While the stop processing is performed by the CPU 1401 according to the present exemplary embodiment, the CPUs 241 to 246 can perform the stop processing.

As described above, the CPU 1401 is included, and the CPU 1401 mainly monitors the force sensors 251 to 256 and performs communication with a shorter communication period than the communication period of the CPU 401, according to the present exemplary embodiment. Thus, in a case where the robot arm main body 200 comes into contact, the CPU 1401 with a short communication period can stop the robot arm main body 200 even in the absence of an instruction from the CPU 401. Thus, the robot arm main body 200 can be stopped promptly, and a robot system with improved responsiveness to external changes is provided. Especially in a case where a predetermined object that is in contact is a user (person), an impact that the user receives is significantly reduced to ensure safety of the user.

Further, the number of communication lines is reduced because of the wireless communication. This reduces the size of the robot arm main body 200 and reduces the mass of the robot arm main body 200, so that an impact of contact with a person decreases. Meanwhile, the stop processing to stop the robot arm main body 200 is performed via the communication line 104, so that the robot arm main body 200 is reliably stopped.

Next, a case where the wireless communication 105 is used in place of the communication line 103 and wireless communication 106 is used in place of the communication line 104 according to an exemplary embodiment will be described in detail below. According to an eighth exemplary embodiment, the communication lines 103 and 104 are not provided in the robot arm main body 200. Instead, the CPU 401 and the CPUs 241 to 246 communicate with each other via the wireless devices 1601 to 1608, and the CPU 1401 and the CPUs 241 to 246 communicate with each other via wireless devices 1801 to 1808. Components of configurations of hardware and a control system that are different from those according to the above-described exemplary embodiments will be described below with reference to the drawings. Components similar to those according to the above-described exemplary embodiments have configurations and actions that are similar to those described above, and detailed descriptions thereof are omitted. Further, the CPU 401 may also be referred to as "first processing unit", and the CPU 1401 may also be referred to as "second processing unit". Further, the wireless communication via the wireless devices 1601 to 1608 may also be referred to as "first wireless communication", and the wireless communication via the wireless device 1801 to 1808 may also be referred to as "second wireless communication".

Figure 18:
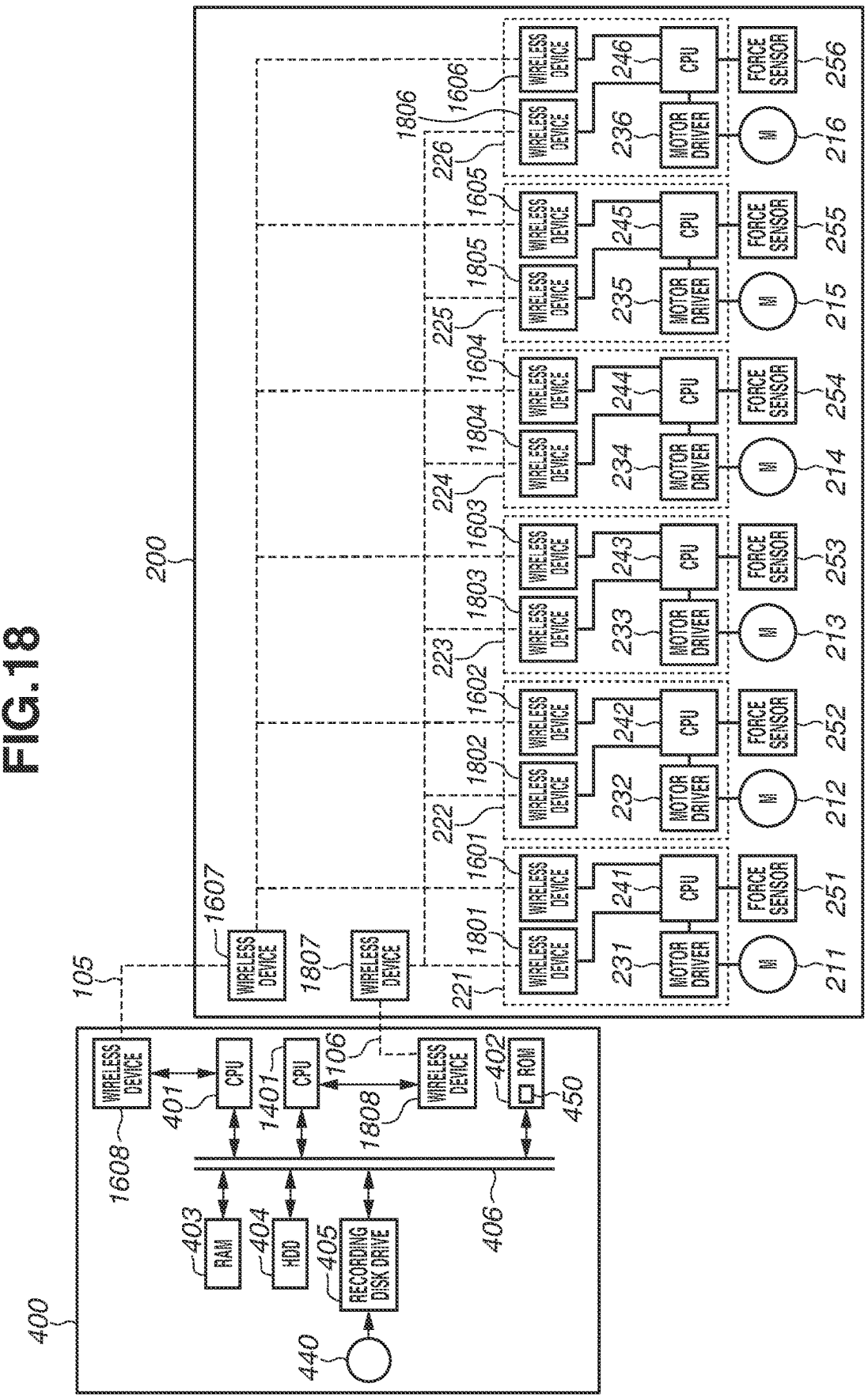
FIG. 18 is a control block diagram illustrating a robot arm main body according to one or more aspects of the present disclosure.

FIG. 18 is a control block diagram illustrating the robot arm main body 200 according to the present exemplary embodiment. As illustrated in FIG. 18, the arm motor control devices 221 to 226 respectively include the wireless devices 1601 to 1606 and respectively include the wireless devices 1801 to 1806. The wireless devices 1601 to 1606 are respectively connected to the CPUs 241 to 246, and the wireless devices 1801 to 1806 are respectively connected to the CPUs 241 to 246. Further, the robot arm main body 200 includes the wireless devices 1607 and 1807. The wireless device 1607 comprehensively controls the wireless devices 1601 to 1606 to perform wireless communication. The wireless device 1807 comprehensively controls the wireless devices 1801 to 1806 to perform wireless communication. Further, the control apparatus 400 includes the wireless device 1608. The wireless device 1608 wirelessly communicates with the wireless device 1607 and is connected to the CPU 401. Similarly, the control apparatus 400 includes the wireless device 1808. The wireless device 1808 wirelessly communicates with the wireless device 1807 and is connected to the CPU 1401. The CPU 401 communicates with the CPUs 241 to 246 via the wireless communication 105 via the wireless devices 1601 to 1608. The CPU 1401 communicates with the CPUs 241 to 246 via the wireless communication 106 via the wireless devices 1801 to 1808.

The CPU 1401 monitors values of the force sensors 251 to 256 of the robot arm main body 200 via the wireless communication 106. While the CPU 1401 monitors the force sensors 251 to 256 through the CPUs 241 to 246 according to the present exemplary embodiment, the CPU 1401 can monitor other information such as information about the motors 211 to 216. Information about the force sensors 251 to 256 is received via the wireless communication 106 and is compared with the reference value that is preset. Further, the comparison result can be transmitted to and received from the CPU 401 via the bus 406. A communication period of the CPU 1401 and the CPUs 241 to 246 using the wireless communication 106 is shorter than a communication period of the CPU 401 and the CPUs 241 to 246 using the wireless communication 105. Further, the CPU 1401 can transmit a stop instruction to the CPUs 241 to 246 based on a comparison between values of the force sensors 251 to 256 and the reference value.

Figure 19:
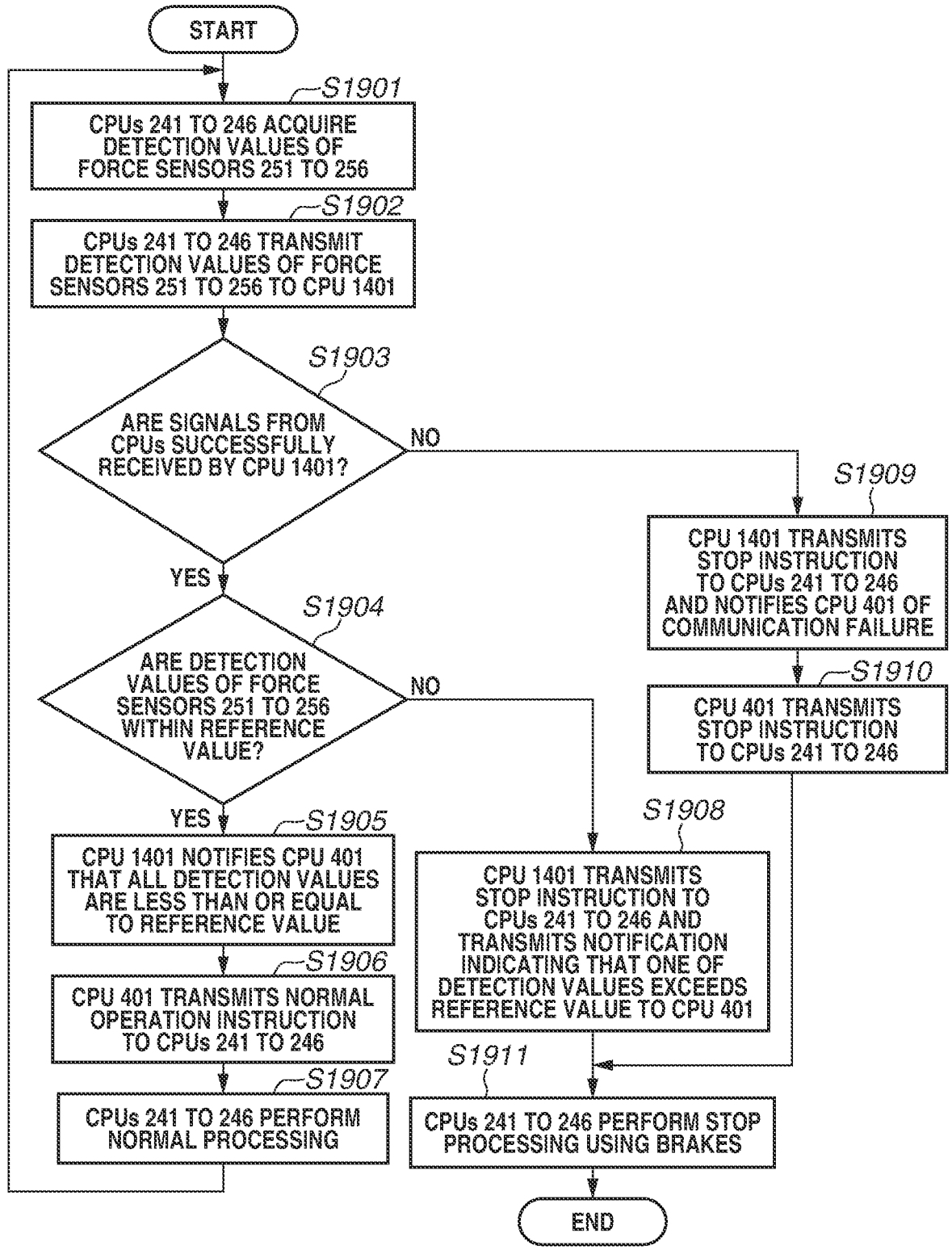
FIG. 19 is a control flowchart according to one or more aspects of the present disclosure.

FIG. 19 is a control flowchart according to the present exemplary embodiment. The control flowchart in FIG. 19 is performed mainly by the CPU 1401, the CPU 401, and the CPUs 241 to 246 of the joints J1 to J6 in collaboration with each other.

In step S1901, the CPUs 241 to 246 acquire detection values of the force sensors 251 to 256. In step S1902, the CPUs 241 to 246 transmit the detection values of the force sensors 251 to 256 that are acquired in step S1901 to the CPU 1401 via the wireless communication 106.

In step S1903, the CPU 1401 determines whether the wireless signals transmitted from the CPUs 241 to 246 in step S1902 are successfully received. If all the signals from the CPUs 241 to 246 are successfully received by the CPU 1401 (YES in step S1903), the processing proceeds to step S1904. If at least one of the signals from the CPUs 241 to 246 is unsuccessfully received (NO in step S1903), the processing proceeds to step S1909.

In step S1904, the CPU 1401 compares the detection values of the force sensors 251 to 256 that are acquired in step S1902 and the reference value, and determines whether the acquired detection values of the force sensors 251 to 256 are within the reference value (or less than or equal to the reference value). If the detection values of the force sensors 251 to 256 are within the reference value (YES in step S1904), the processing proceeds to step S1905. If at least one of the detection values of the force sensors 251 to 256 is not within the reference value (NO in step S1904), the processing proceeds to step S1908. While a case where at least one of the detection values is not within the reference value is described according to the present exemplary embodiment, the condition can be set as appropriate, e.g., two or three of the detection values.

In step S1905, the CPU 1401 notifies (or transmits a notification to) the CPU 401 that the detection values of the force sensors 251 to 256 are within the reference value.

In step S1906, the CPU 401 transmits a normal operation instruction to the CPUs 241 to 246. In step S1907, the CPUs 241 to 246 perform the normal processing based on the operation instructions received in step S1906. The processing then returns to step S1901 to repeat the control flow described above.

In step S1909, the CPU 1401 transmits a stop instruction to the CPUs 241 to 246 via the wireless communication 106.

The CPU 1401 notifies (or transmits a notification to) the CPU 401 that the communication with the CPUs 241 to 246 via the wireless communication 106 is partially or entirely unperformable.

In step S1910, the CPU 401 transmits a stop instruction to the CPUs 241 to 246 via the wireless communication 105. Since the stop instruction is transmitted via the wireless communication 105 even in a case where an abnormality occurs in the wireless communication 106, the robot arm main body 200 is reliably stopped.

In step S1908, the CPU 1401 transmits a stop instruction to the CPUs 241 to 246 via the wireless communication 106. Besides the transmission of the stop instruction, the CPU 1401 notifies (or transmits a notification to) the CPU 401 that one of the detection values of the force sensors 251 to 256 has exceeded the reference value. Since the communication period using the wireless communication 106 is shorter than the communication period using the wireless communication 105, the CPU 1401 can transmit a stop instruction to the CPUs 241 to 246 faster than a case where a stop instruction is output via the CPU 401.

In step S1911, the CPUs 241 to 246 perform stop processing using the brakes 271 to 276. The stop processing is the processing of slowing down and stopping the arm motors 211 to 216 and then preventing the arm motors 211 to 216 from operating by a control signal and an external force using the brakes 271 to 276. The processing of slowing down and stopping can be the processing of stopping the operable arm motors 211 to 216 along a path of a control target, the processing of moving the operable arm motors 211 to 216 in a direction to avoid receipt of further contact force to stop the operable arm motors 211 to 216, or the processing of stopping the operable arm motors 211 to 216 at a highest speed possible within a range that specifications of the arm motors 211 to 216 allow, or any other methods can be used. After the arm motors 211 to 216 stop rotating, the rotations of the arm motors 211 to 216 are fixed by the brakes 271 to 276 to prevent the robot arm main body 200 from operating. While the stop processing is performed by the CPU 1401 according to the present exemplary embodiment, the CPUs 241 to 246 can perform the stop processing.

As described above, the CPU 1401 mainly monitors the force sensors 251 to 256 and performs communication with a shorter communication period than the communication period of the CPU 401, according to the present exemplary embodiment. When the robot arm main body 200 comes into contact, the CPU 1401 with a short communication period can thereby stop the robot arm main body 200 even in the absence of an instruction from the CPU 401. Thus, the robot arm main body 200 can be stopped promptly, and a robot system with improved responsiveness to external changes is provided. Especially in a case where a predetermined object that is in contact is a user (person), an impact that the user receives is significantly reduced to ensure safety of the user. Further, in a case where there is a CPU that cannot acquire a signal via the wireless communication 106 for communicating with the CPU 1401, the stop processing to stop the robot arm main body 200 is performed via the wireless communication 105 and the wireless communication 106 regardless of a detection value of a force sensor. This reduces a danger to the user that may be caused by missing an abnormality value of a force sensor due to an abnormality of the wireless communication 106. Furthermore, since the stop processing is performed via the two wireless communications, the robot arm main body 200 is reliably stopped.

Further, with the wireless communication, the number of communication lines is reduced. This reduces the size of the robot arm main body 200 and the mass of the robot arm main body 200, so that an impact of contact with a person decreases.

The above-described processes according to the exemplary embodiments described above are specifically performed by a CPU of a control device or a CPU of an arm motor control device. Thus, a program of software for performing the above-described functions can be recorded in a recording medium and read from the recording medium, and the read program can be executed. In this case, the program read from the recording medium realizes the functions of the above-described exemplary embodiments, and the program and the recording medium that records the program are encompassed within the scope of the present disclosure.

Further, a computer-readable recording medium is a ROM, a RAM, or a flash ROM and a program is stored in the ROM, the RAM, or the flash ROM, according to the exemplary embodiments. However, the present disclosure is not limited to the foregoing forms. A program for implementing the present disclosure can be recorded in any computer-readable recording mediums. Examples of the recording mediums for supplying a control program include an HDD, an external storage device, and a recording disk.

Further, a multi-joint robot arm with the robot arm main body 200 including a plurality of joints is used according to the various exemplary embodiments is described above, but the number of joint is not limited to the number specified above. While a robot arm form having a vertical multi-axes structure is described above, a configuration equivalent to the above-described structure is implementable also with a different form of joints, such as a horizontal multi-joint type, a parallel link type, or a Cartesian coordinate robot.

Further, while the stopping of the arm motors 211 to 216 of the robot arm main body 200 according to the various exemplary embodiments is described above as an example, the present disclosure is not limited to those described above. For example, the hand motor 311 can be stopped by a method according to an aspect of the present disclosure using the hand motor 311 of the robot hand main body 300 as a lower system.

According to the various exemplary embodiments described above, the stop processing is performed when a detection value of a force sensor or an output value of a failure detection unit exceeds the reference value, whereas the normal processing is performed when a detection value of a force sensor or an output value of a failure detection unit is less than or equal to the reference value. Alternatively, the stop processing can be performed when a detection value of a force sensor or an output value of a failure detection unit is greater than or equal to the reference value, whereas the normal processing can be performed when a detection value of a force sensor or an output value of a failure detection unit is less than the reference value.

The various exemplary embodiments described above are applicable to machines capable of automatically extending, contracting, bending, stretching, moving upward, moving downward, moving rightward, moving leftward, turning, or performing a combination thereof based on information about a storage device of a control device.

The present disclosure is not limited to the above-described exemplary embodiments and can be modified in many ways within the spirit of the present disclosure. Further, advantages according to the exemplary embodiments of the present disclosure are a mere list of desirable advantages produced by the present disclosure and are not limited to those disclosed herein. The above-described various exemplary embodiments and the modified example can also be performed in combination.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-141146, filed Aug. 31, 2021, and No. 2022-095303, filed Jun. 13, 2022, which are hereby incorporated by reference herein in their entirety.

What is claimed is:

1. A robot system, comprising:
a robot main body including a plurality of driving sources;
first control devices provided respectively correspondingly to the plurality of driving sources in the robot main body, each of the first control devices being configured to control the corresponding driving source; and
sensors provided respectively correspondingly to the plurality of driving sources in the robot main body, each of the sensors being configured to acquire information regarding contact between the robot main body and an object,
wherein in a case where one of the first control devices has obtained, based on a result of detection performed by the corresponding sensor, that the robot main body is in a contact state, the one of the first control devices causes the driving source corresponding the one of the first control devices to stop driving and outputs, to all the first control devices other than the one of the first control devices, a signal for causing all the remaining first control devices other than the one of the first control devices to stop driving the corresponding driving sources.

2. The robot system according to claim 1, wherein the first control devices stop the robot main body by using at least one of a method of stopping along a path of the robot main body, a method of stopping after moving from the contact state in a direction to avoid receipt of further force, and a method of stopping at a highest speed possible within a range that a specification of the robot main body allows.

3. The robot system according to claim 1, wherein in a state where the robot main body is stopped, the first control devices determine whether the robot main body is in the contact state based on the acquired information by the sensors.

4. The robot system according to claim 3, wherein in a case where the robot main body is in the contact state in receiving an instruction to perform a return operation in the state where the robot main body is stopped, the first control devices do not perform the return operation.

5. The robot system according to claim 1, wherein the one of the first control devices performs stopping in parallel with transmitting of the information regarding the contact between the robot main body and the object.

6. The robot system according to claim 1, further comprising a second control device configured to communicate with each of the first control devices and control the robot main body entirely,
wherein the information is output not via the second control device.

7. The robot system according to claim 6, wherein a period of first communication between the first control devices is shorter than a period of second communication between the first control devices and the second control device.

8. The robot system according to claim 7, wherein the first communication is performed using at least one of a cascade connection, a bus connection, and a daisy-chain connection.

9. The robot system according to claim 6, further comprising:
a first communication line via which first communication between the first control devices is performed; and
a second communication line via which second communication between the first control devices and the second control device is performed.

10. The robot system according to claim 9, wherein in a case where the robot main body is not in the contact state, the first communication line is not used.

11. The robot system according to claim 6, wherein first communication between the first control devices and second communication between the first control devices and the second control device are multiplexed.

12. The robot system according to claim 11, wherein in a case where the robot main body is not in the contact state, the first communication is not used.

13. The robot system according to claim 6,
wherein in a state where the robot main body is stopped, the first control devices determine whether the robot main body is in the contact state based on the acquired information by the sensors, and
wherein information indicating that the robot main body is in the contact state is output to the second control device.

14. The robot system according to claim 1,
wherein each of the sensors is a sensor configured to detect force information, and wherein the first control devices acquire the contact based on the force information detected by the sensor.

15. The robot system according to claim 1,
wherein the robot main body includes:
a plurality of joints, and
wherein the plurality of driving sources are provided respectively correspondingly to the plurality of joints.

16. The robot system according to claim 1,
wherein the robot main body includes a robot arm and a robot hand, and
wherein the robot hand includes at least one of the first control devices.

17. The robot system according to claim 1, further comprising a second control device configured to communicate with each of the first control devices and control the robot main body entirely,
wherein the second control device includes:
a first processing unit configured to perform first communication with the first control devices via a first communication line; and
a second processing unit configured to perform second communication with the first control devices via a second communication line,
wherein a period of the second communication is shorter than a period of the first communication, and
wherein the second processing unit stops the robot main body using the second communication based on the acquired information by the sensors.

18. The robot system according to claim 1, further comprising a second control device configured to communicate with each of the first control devices and control the robot main body entirely,
wherein the second control device includes:
a first processing unit configured to perform first communication with the first control devices using wireless communication; and
a second processing unit configured to perform second communication with the first control devices via a wired communication,
wherein a period of the second communication is shorter than a period of the first communication, and
wherein the second processing unit stops the robot main body using the second communication based on the acquired information by the sensors.

19. The robot system according to claim 1, further comprising a second control device configured to communicate with each of the first control devices and control the robot main body entirely,
wherein the second control device includes:
a first processing unit configured to perform first communication with the first control devices using first wireless communication; and
a second processing unit configured to perform second communication with "the first control device using second wireless communication,
wherein a period of the second communication is shorter than a period of the first communication, and
wherein the second processing unit stops the robot main body using the second communication based on the acquired information by the sensors.

20. The robot system according to claim 19, wherein in a case where a signal is not acquired from a part of the first control devices using the second communication, the second processing unit stops the robot main body using the second communication and causes the first processing unit to stop the robot main body using the first communication.

21. A method of manufacturing an article using the robot system according to claim 1.

22. A method of controlling a robot system, the robot system including:
a robot main body including a plurality of driving sources;
first control devices provided respectively correspondingly to the plurality of driving sources in the robot main body, each of the first control devices being configured to control the corresponding driving source; and
sensors provided respectively correspondingly to the plurality of driving sources in the robot main body, each of the sensors being configured to acquire information regarding contact between the robot main body and an object,
wherein in a case where one of the first control devices has obtained, based on a result of detection performed by the corresponding sensor, that the robot main body is in a contact state, the one of the first control devices causes the driving source corresponding the one of the first control devices to stop driving and outputs, to all the first control devices other than the one of the first control devices, a signal for causing all the remaining first control devices other than the one of the first control devices to stop driving the corresponding driving sources.

23. A system, comprising:
an apparatus including a plurality of driving sources;
first control devices disposed respectively correspondingly to the plurality of driving sources in the apparatus, each of the first control devices being configured to control the corresponding driving source; and
sensors disposed respectively correspondingly to the plurality of driving sources in the apparatus, each of the sensors being configured to acquire information regarding contact between the apparatus and an object,
wherein in a case where one of the first control devices has obtained, based on a result of detection performed by the corresponding sensor, that the robot main body is in a contact state, the one of the first control devices causes the driving source corresponding the one of the first control devices to stop driving and outputs, to all the first control devices other than the one of the first control devices, a signal for causing all the remaining first control devices other than the one of the first control devices to stop driving the corresponding driving sources.

24. A method for controlling a system, the system comprising:
an apparatus including a plurality of driving sources;
first control devices disposed respectively correspondingly to the plurality of driving sources in the apparatus, each of the first control devices being configured to control the corresponding driving source; and
sensors disposed respectively correspondingly to the plurality of driving sources in the apparatus, each of the sensors being configured to acquire information regarding contact between the apparatus and an object,
wherein in a case where one of the first control devices has obtained, based on a result of detection performed by the corresponding sensor, that the robot main body is in a contact state, the one of the first control devices controls the driving source corresponding the one of the first control devices to stop driving and outputs, to all the first control devices other than the one of the first control devices, a signal for causing all the remaining first control devices other than the one of the first control devices to stop driving the corresponding driving sources.

25. A non-transitory computer-readable recording medium that stores a control program configured to execute the control method according to claim 22.

26. The robot system according to claim 1, wherein the one of the first control devices outputs the signal to the other first control devices of the first control devices than the one of the first control devices directly or indirectly.

* * * * *